US011140373B2

(12) United States Patent
Oh et al.

(10) Patent No.: US 11,140,373 B2
(45) Date of Patent: Oct. 5, 2021

(54) METHOD FOR TRANSMITTING 360-DEGREE VIDEO, METHOD FOR RECEIVING 360-DEGREE VIDEO, APPARATUS FOR TRANSMITTING 360-DEGREE VIDEO, AND APPARATUS FOR RECEIVING 360-DEGREE VIDEO

(71) Applicant: LG ELECTRONICS INC., Seoul (KR)

(72) Inventors: Hyunmook Oh, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/958,033

(22) PCT Filed: Apr. 3, 2019

(86) PCT No.: PCT/KR2019/003939
§ 371 (c)(1),
(2) Date: Jun. 25, 2020

(87) PCT Pub. No.: WO2019/194573
PCT Pub. Date: Oct. 10, 2019

(65) Prior Publication Data
US 2020/0322587 A1 Oct. 8, 2020

Related U.S. Application Data

(60) Provisional application No. 62/653,527, filed on Apr. 5, 2018.

(51) Int. Cl.
*H04N 13/117* (2018.01)
*H04N 13/161* (2018.01)
(Continued)

(52) U.S. Cl.
CPC ......... *H04N 13/117* (2018.05); *H04N 13/161* (2018.05); *H04N 13/178* (2018.05); *H04N 13/194* (2018.05)

(58) Field of Classification Search
CPC .. H04N 13/117; H04N 13/161; H04N 13/194; H04N 13/178
USPC ......................................................... 348/43
See application file for complete search history.

(56) References Cited

U.S. PATENT DOCUMENTS

2017/0294049 A1   10/2017 Zhou
2018/0077210 A1*   3/2018 Hannuksela .......... H04L 65/607
(Continued)

FOREIGN PATENT DOCUMENTS

KR   10-2009-0123743 A   12/2009
KR       20180029344 A *  3/2018 ........... H04N 13/178
(Continued)

OTHER PUBLICATIONS

Skupin et al., "Standardization Status of 360 degree Video Coding and Delivery," 2017 IEEE Visual Communications and Image Processing (VCIP), IEEE, St. Petersburg, Florida, USA, Dec. 10-13, 2017 (See section II-III.) (5 Pages).

*Primary Examiner* — Susan E. Hodges
(74) *Attorney, Agent, or Firm* — Dentons US LLP

(57) ABSTRACT

A 360-degree video data processing method performed by a 360-degree video reception apparatus, according to the present invention, comprises the steps of: receiving 360-degree video data for a plurality of views; deriving metadata and information on a packed picture; decoding the packed picture based on the information on the packed picture; deriving a specific packed region for a target view from the packed picture based on the metadata; deriving a projected picture of the target view based on the specific packed region and the metadata; and rendering the projected picture based (Continued)

on the metadata, wherein the metadata includes multiview region-wise packing information, and wherein the multiview region-wise packing information includes information about a packed region in the packed picture and information about the target view.

13 Claims, 19 Drawing Sheets

(51) Int. Cl.
*H04N 13/178* (2018.01)
*H04N 13/194* (2018.01)

(56) References Cited

U.S. PATENT DOCUMENTS

| | | | |
|---|---|---|---|
| 2018/0192001 A1* | 7/2018 | Boyce | H04N 19/167 |
| 2019/0281318 A1* | 9/2019 | Han | H04N 17/004 |
| 2020/0045286 A1* | 2/2020 | Boyce | H04N 13/178 |
| 2020/0105063 A1* | 4/2020 | Wang | G06F 3/011 |
| 2020/0382809 A1* | 12/2020 | Deshpande | H04N 21/854 |

FOREIGN PATENT DOCUMENTS

| | | | | |
|---|---|---|---|---|
| KR | 1020180028299 A | 3/2018 | | |
| WO | WO-2017142353 A1 * | 8/2017 | | H04N 21/81 |
| WO | 2017-204491 A1 | 11/2017 | | |
| WO | 2017-205794 A1 | 11/2017 | | |
| WO | WO-2018038523 A1 * | 3/2018 | | G06T 3/0037 |

* cited by examiner

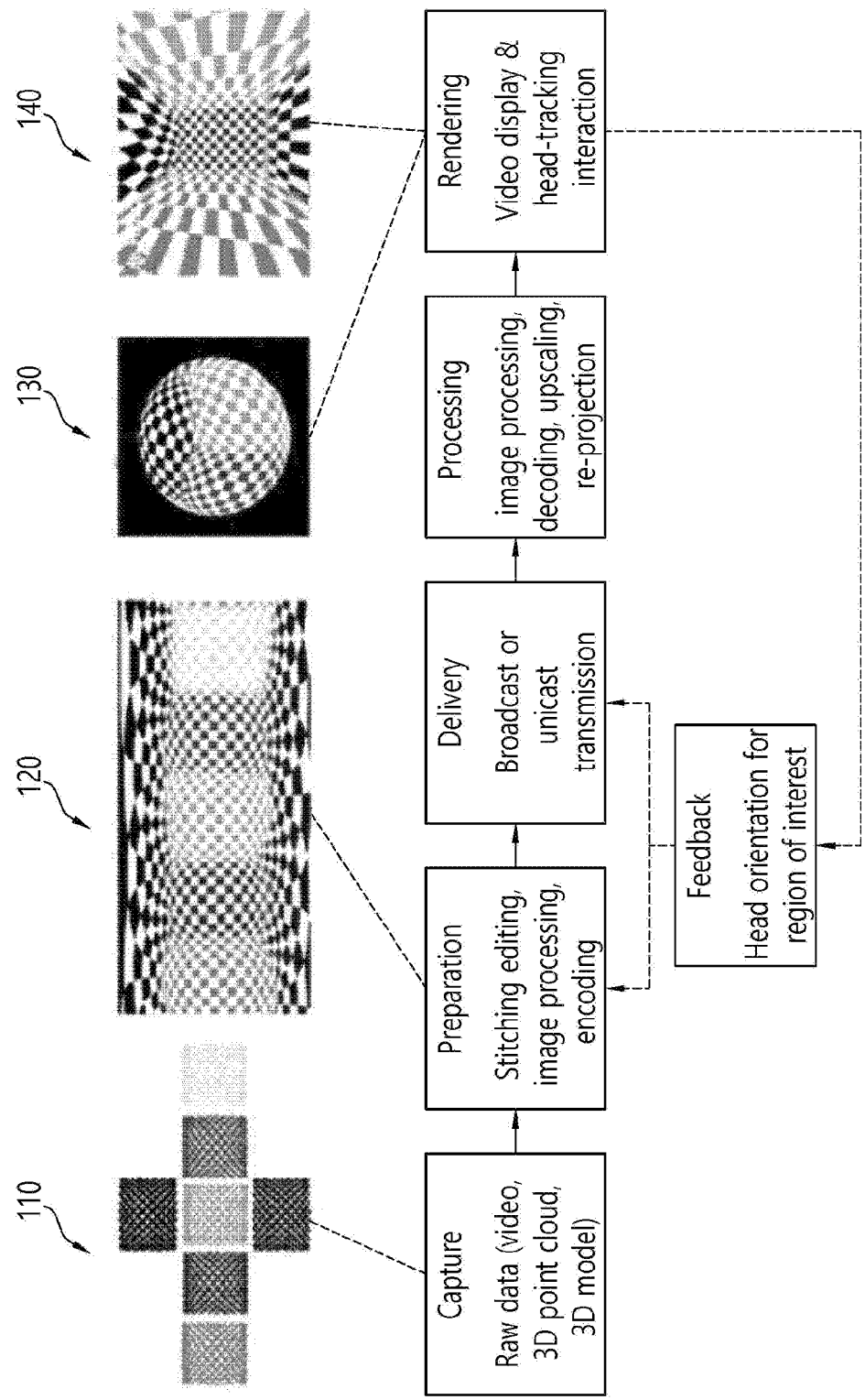
[Fig. 1]

[Fig. 2]
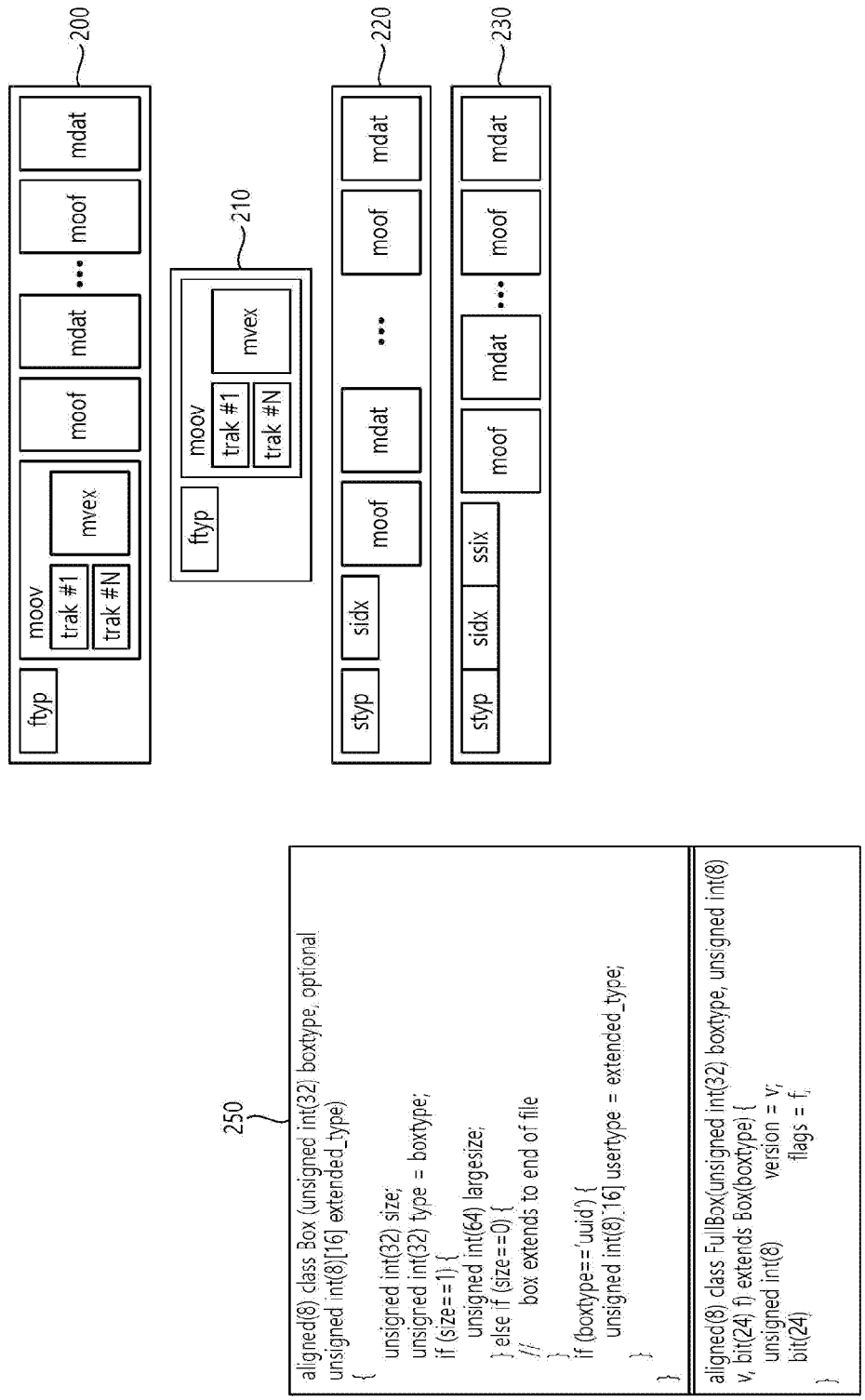

[Fig. 3]
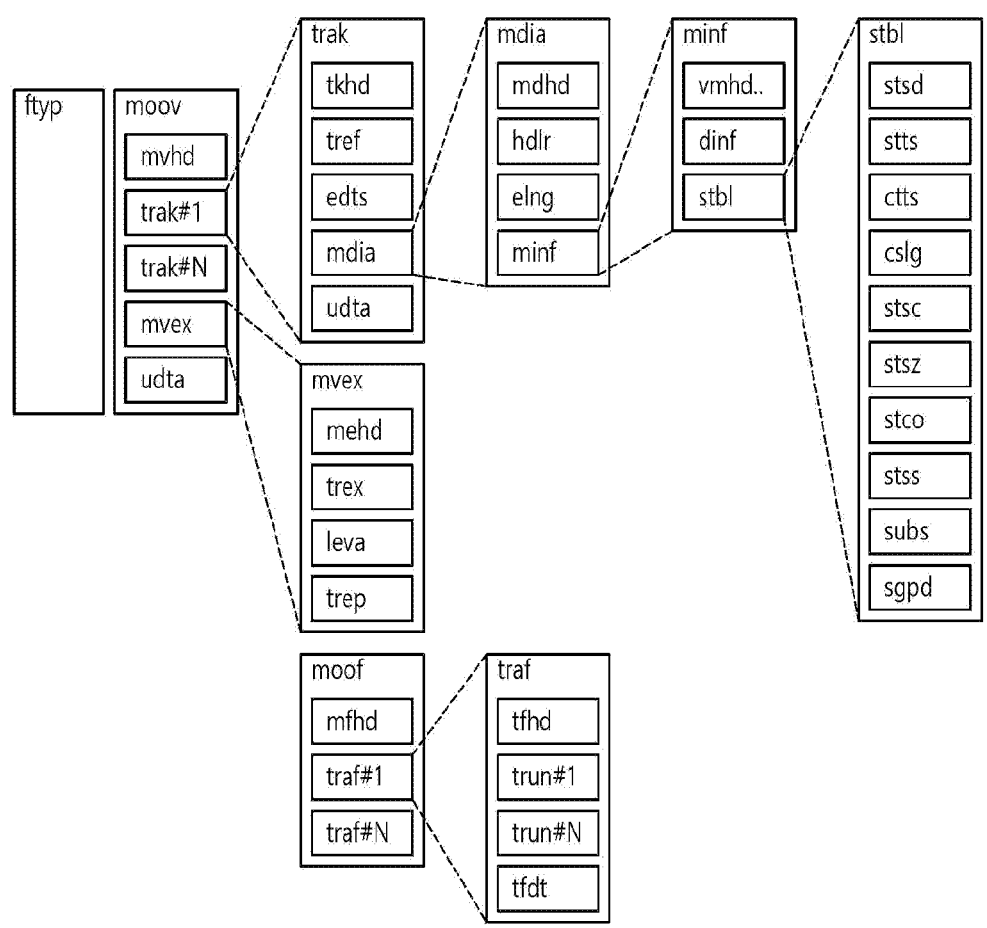

[Fig. 4]
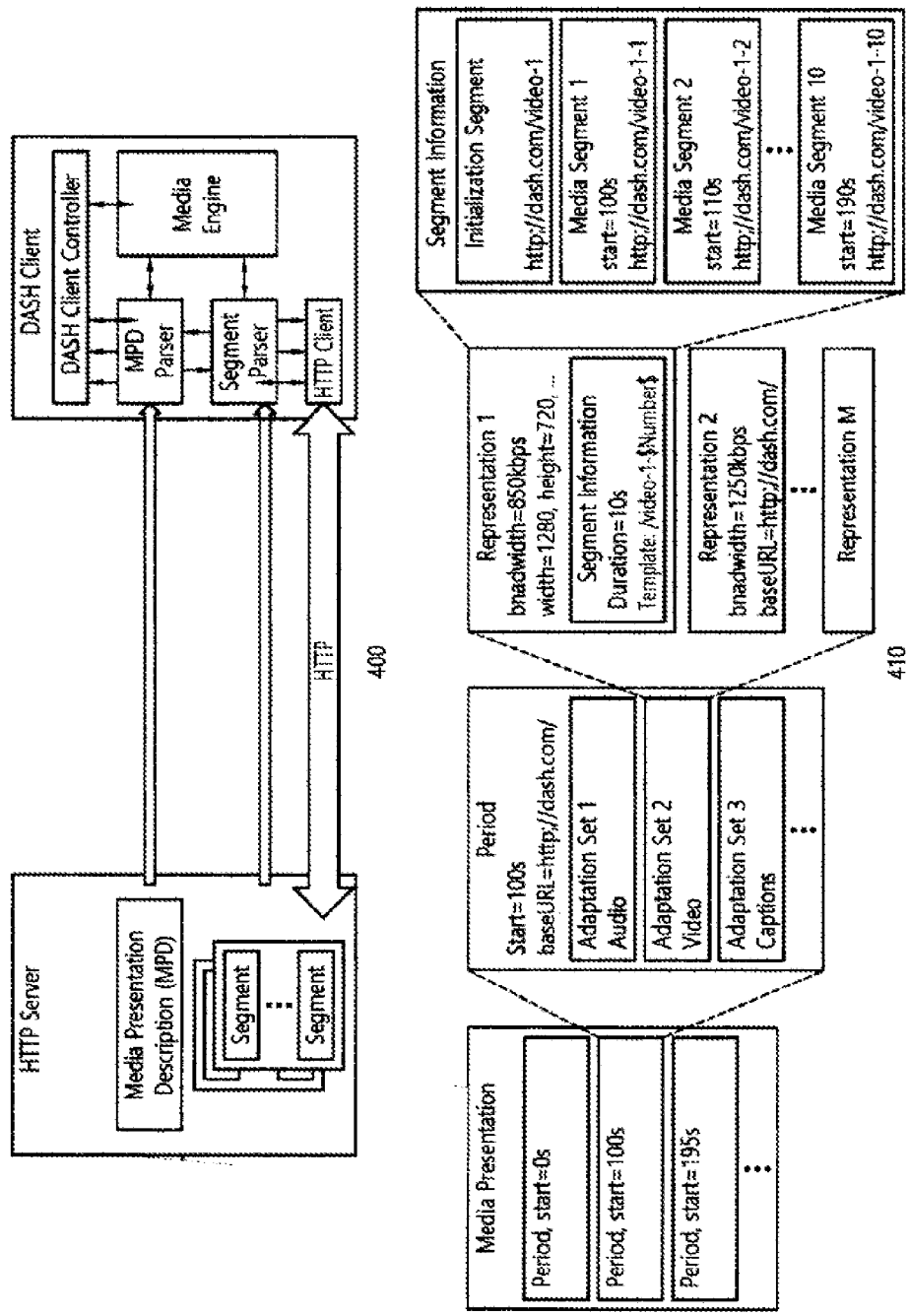

[Fig. 5]
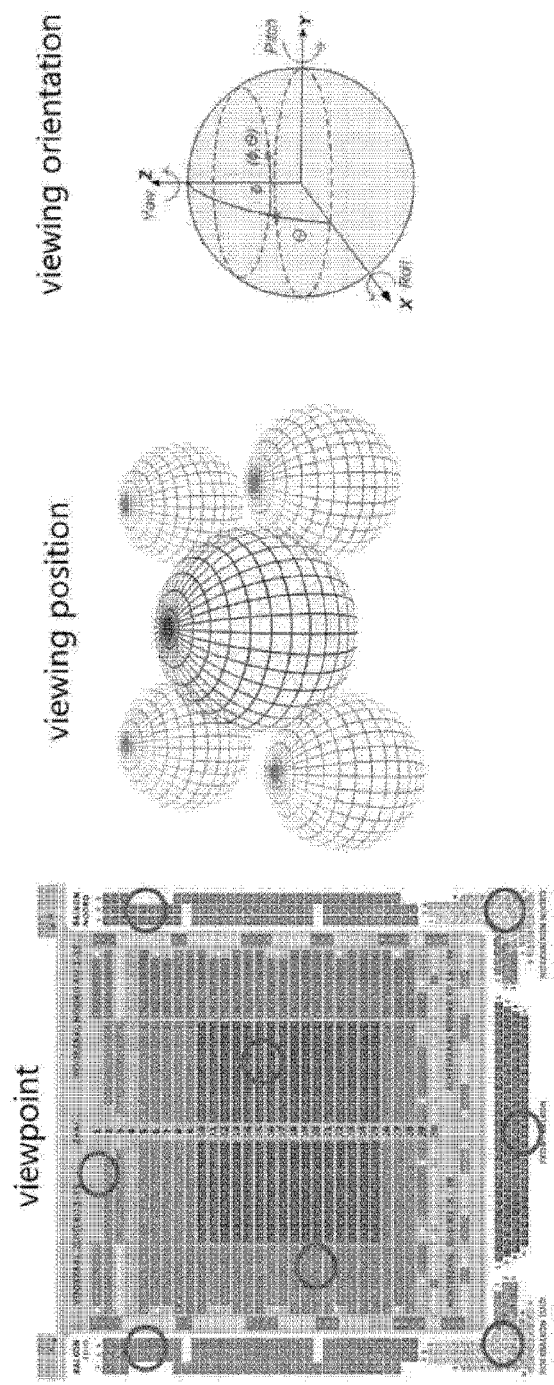

[Fig. 6]
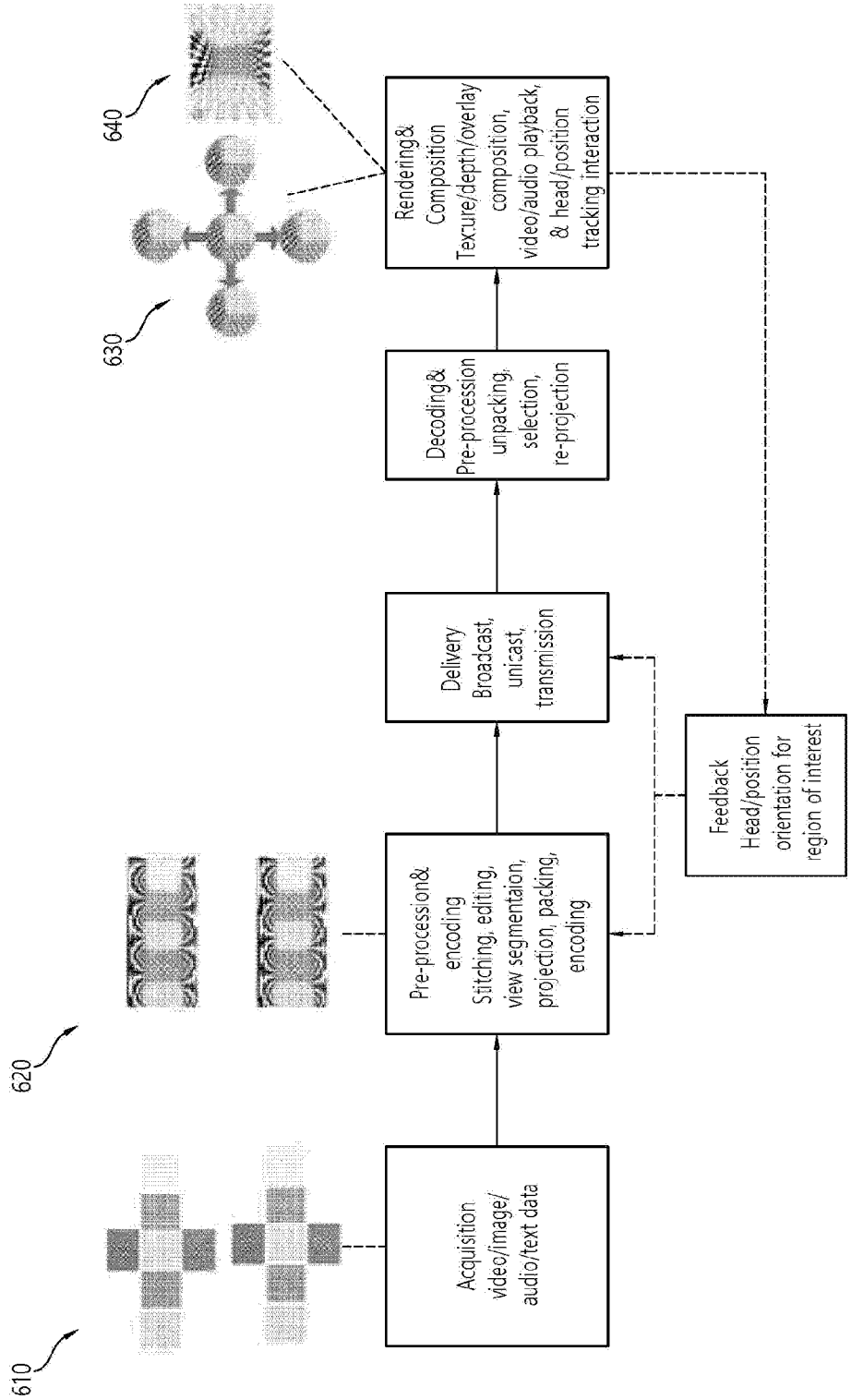

[Fig. 7]
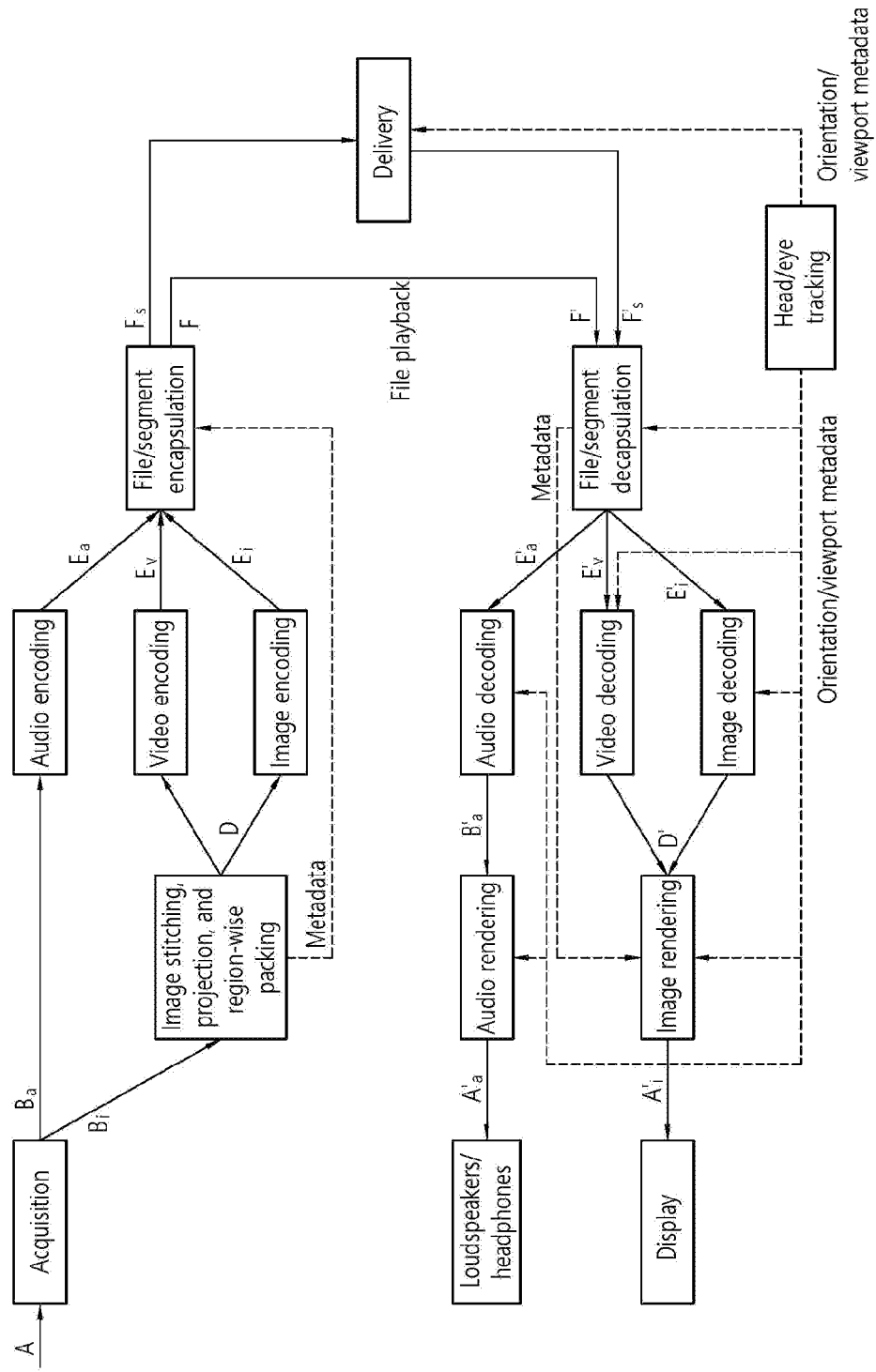

[Fig. 8]
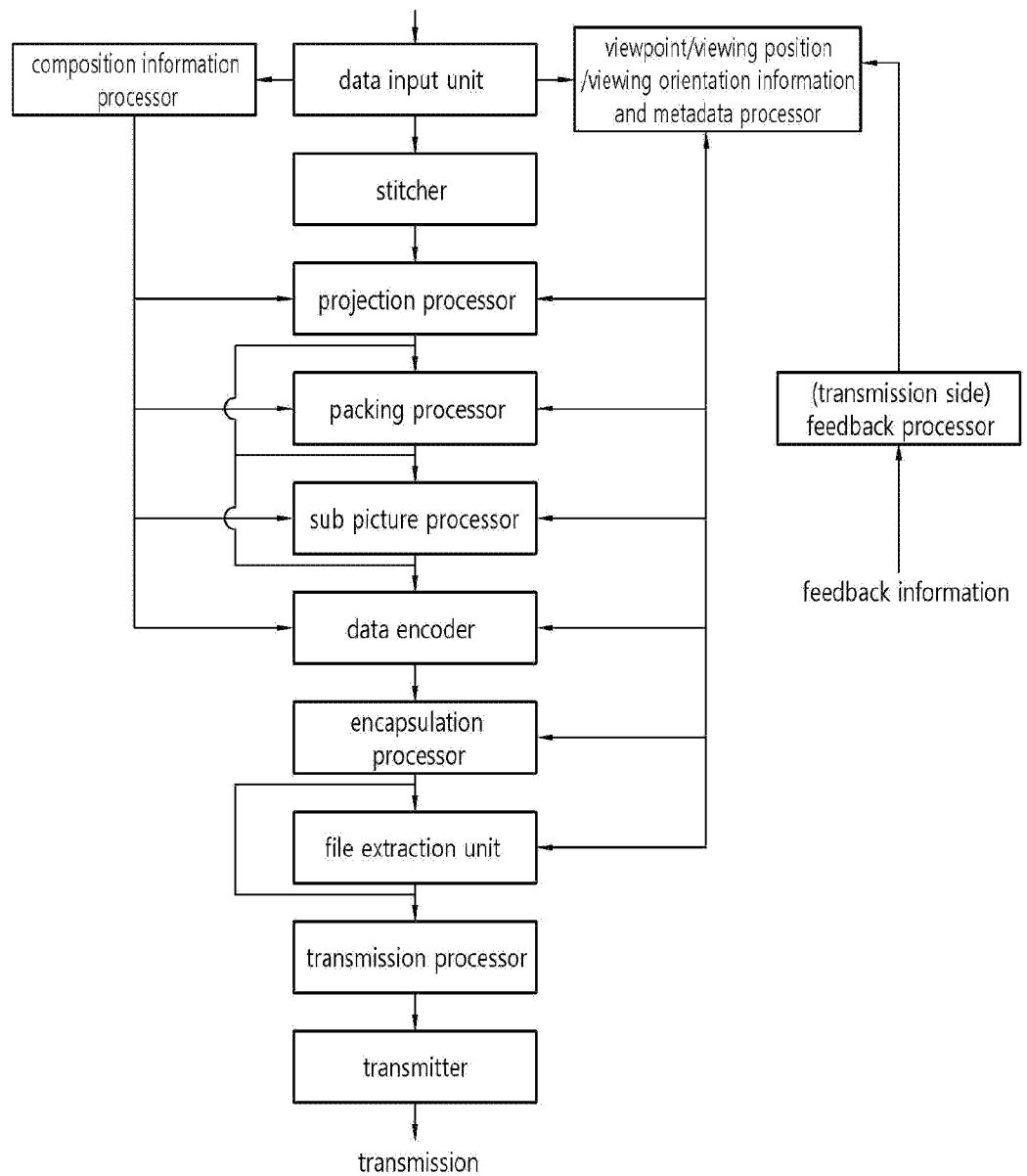

[Fig. 9]
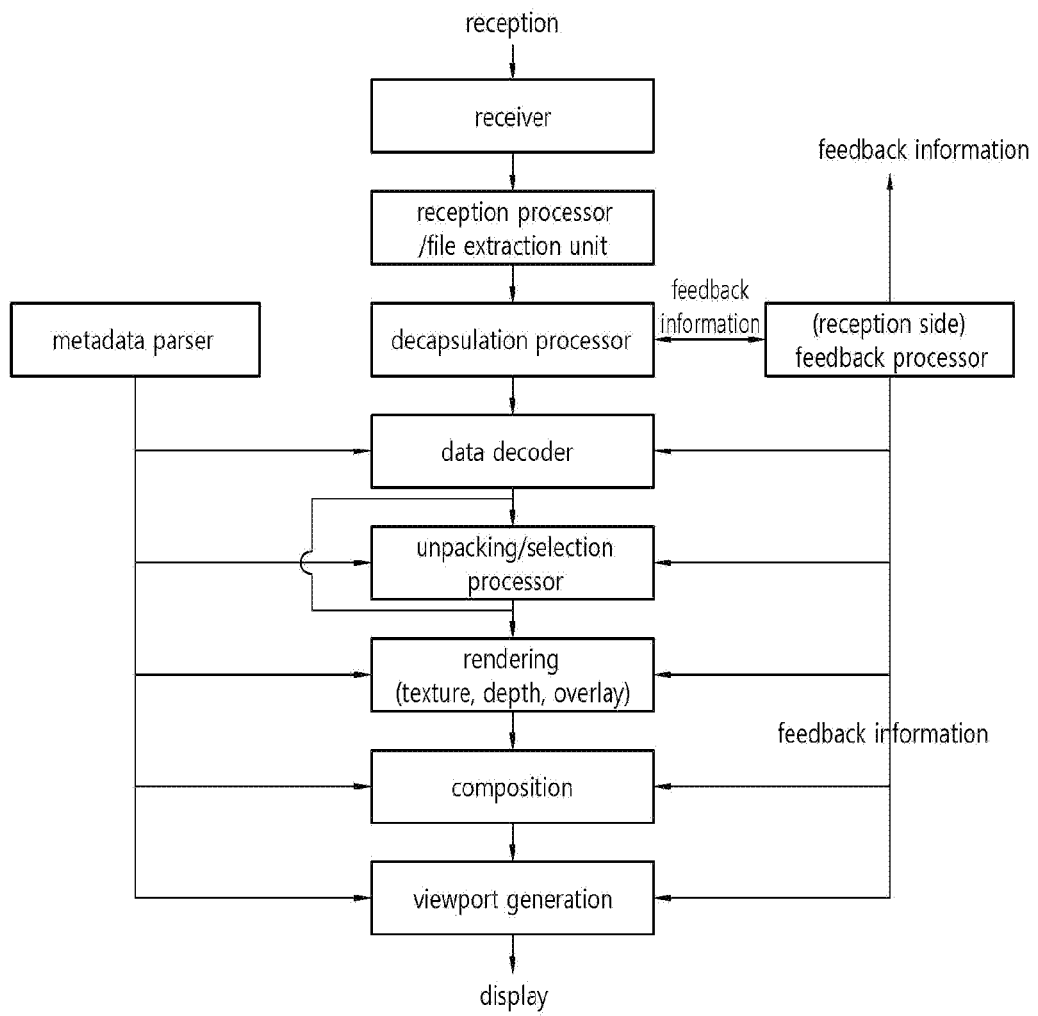

[Fig. 10]
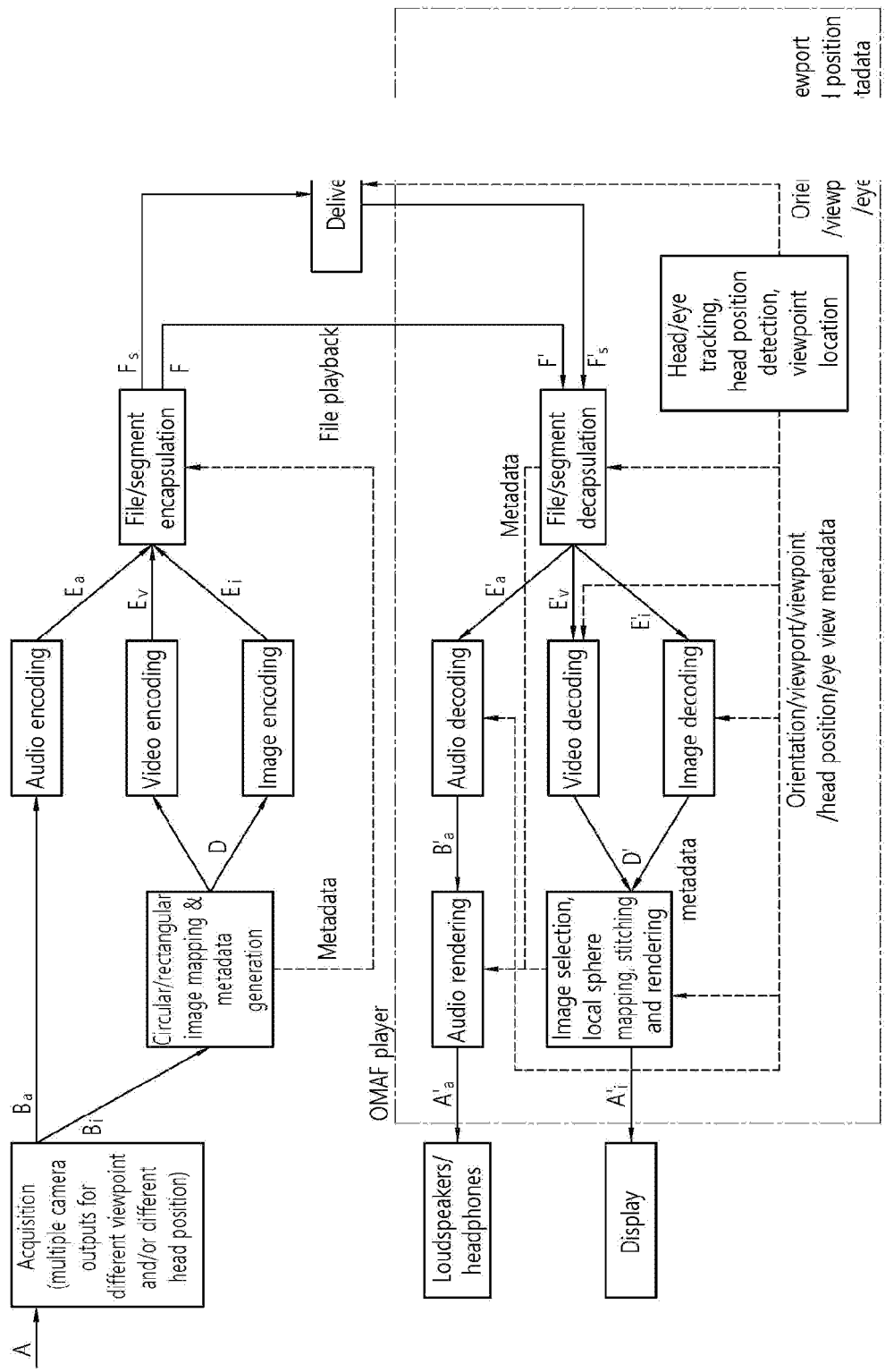

[Fig. 11]
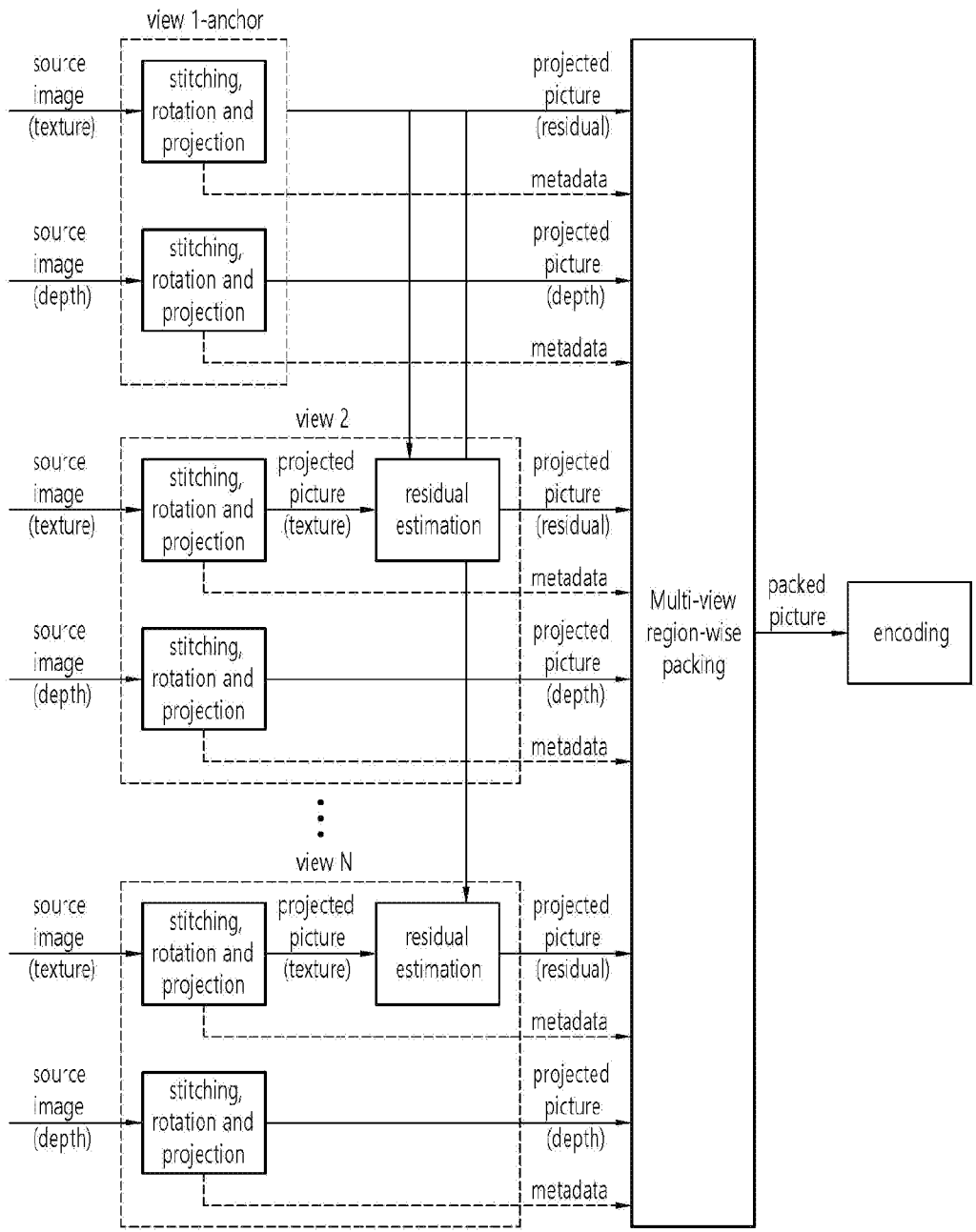

[Fig. 12]
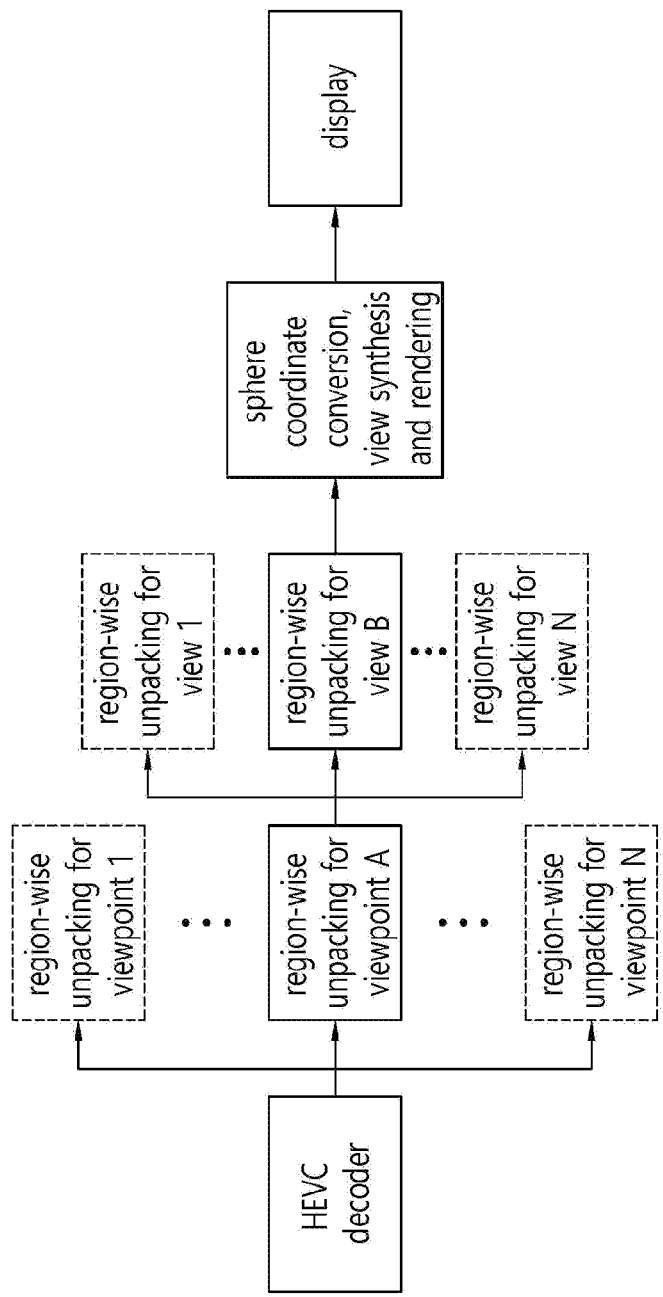

[Fig. 13]
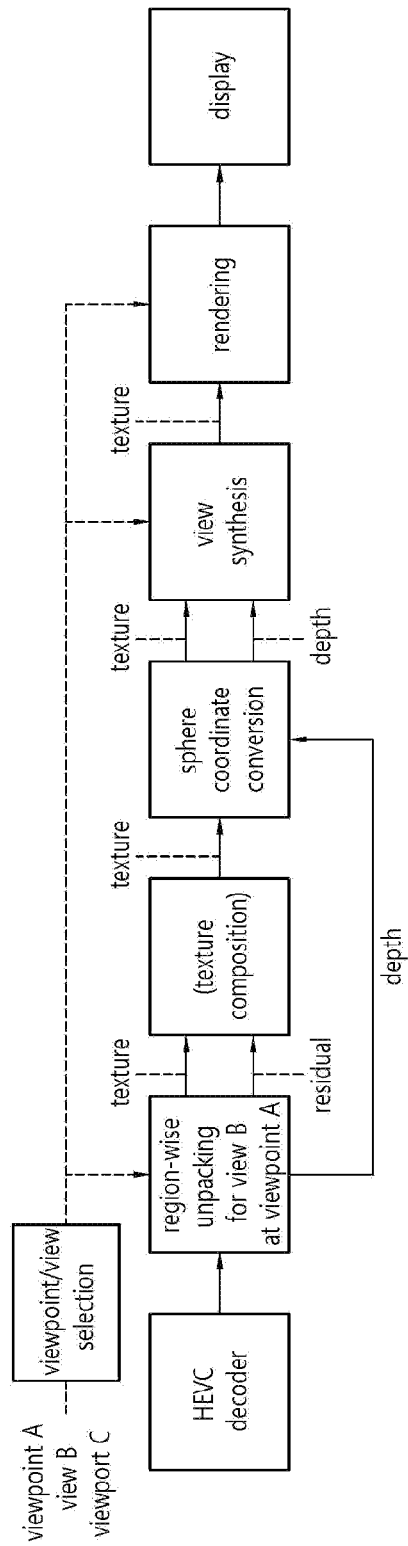

[Fig. 14a]
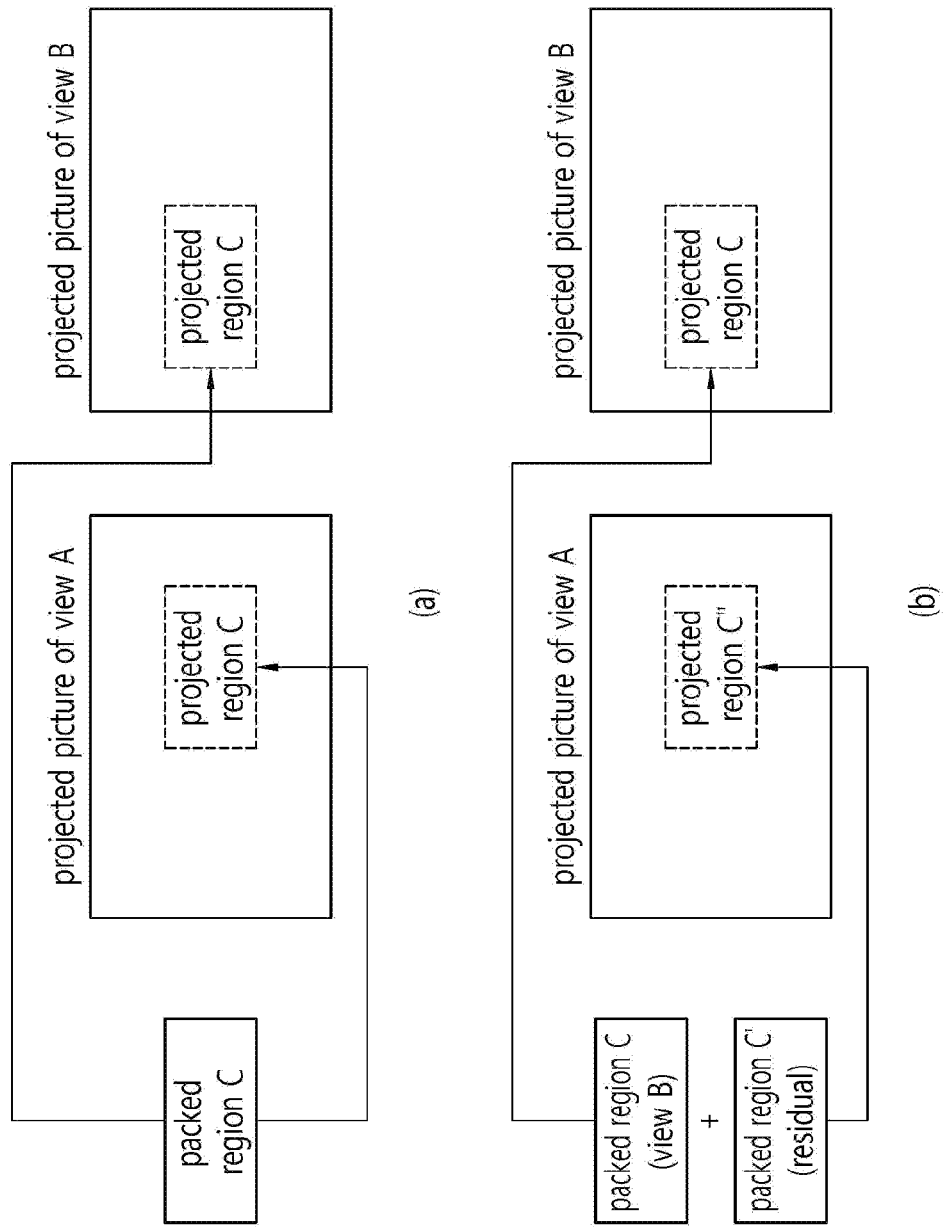

[Fig. 14b]
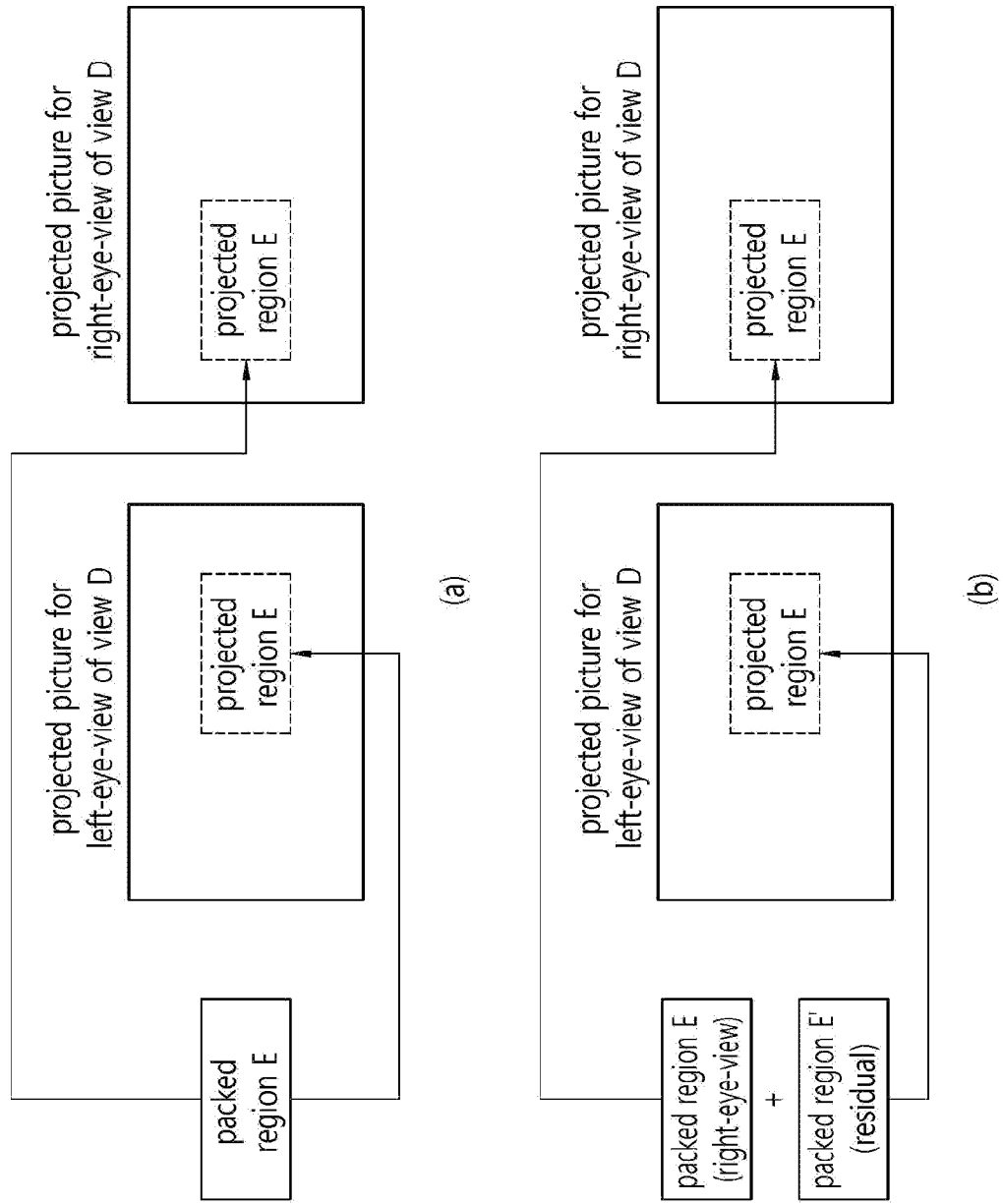

[Fig. 15]
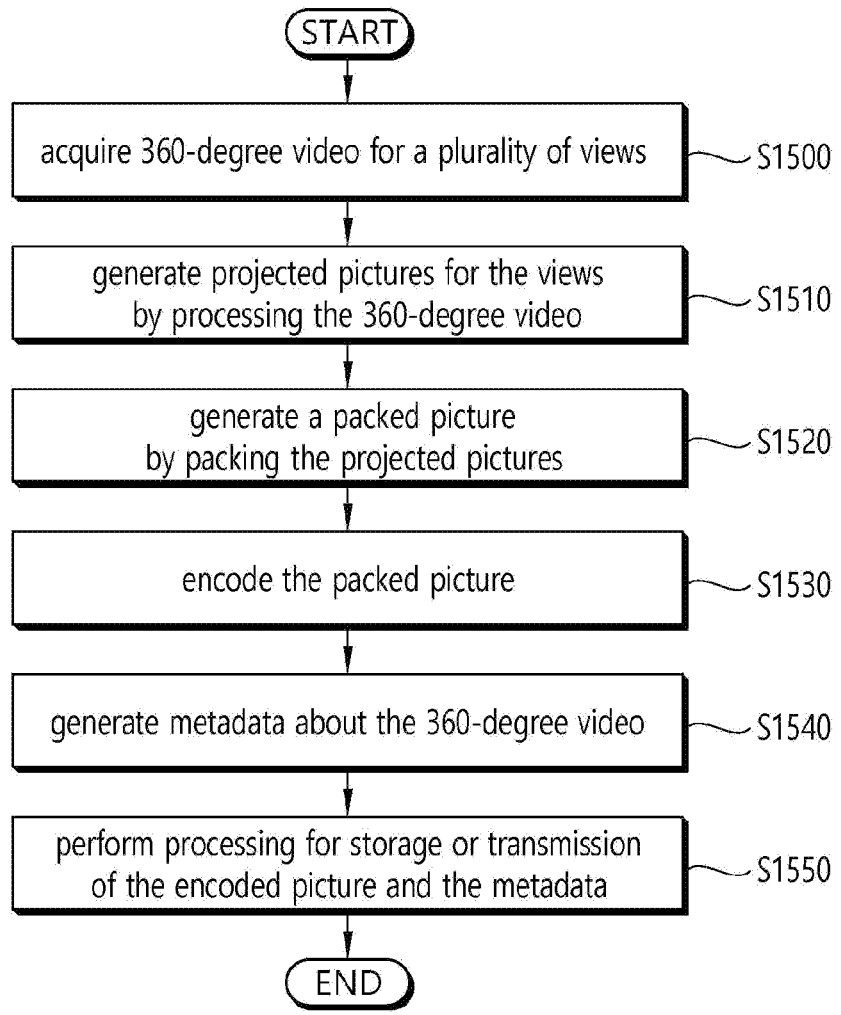

[Fig. 16]
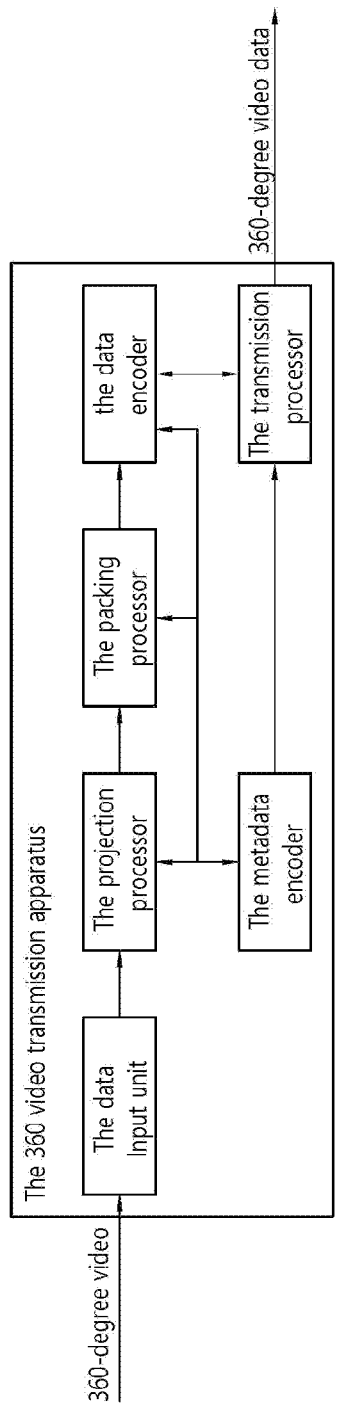

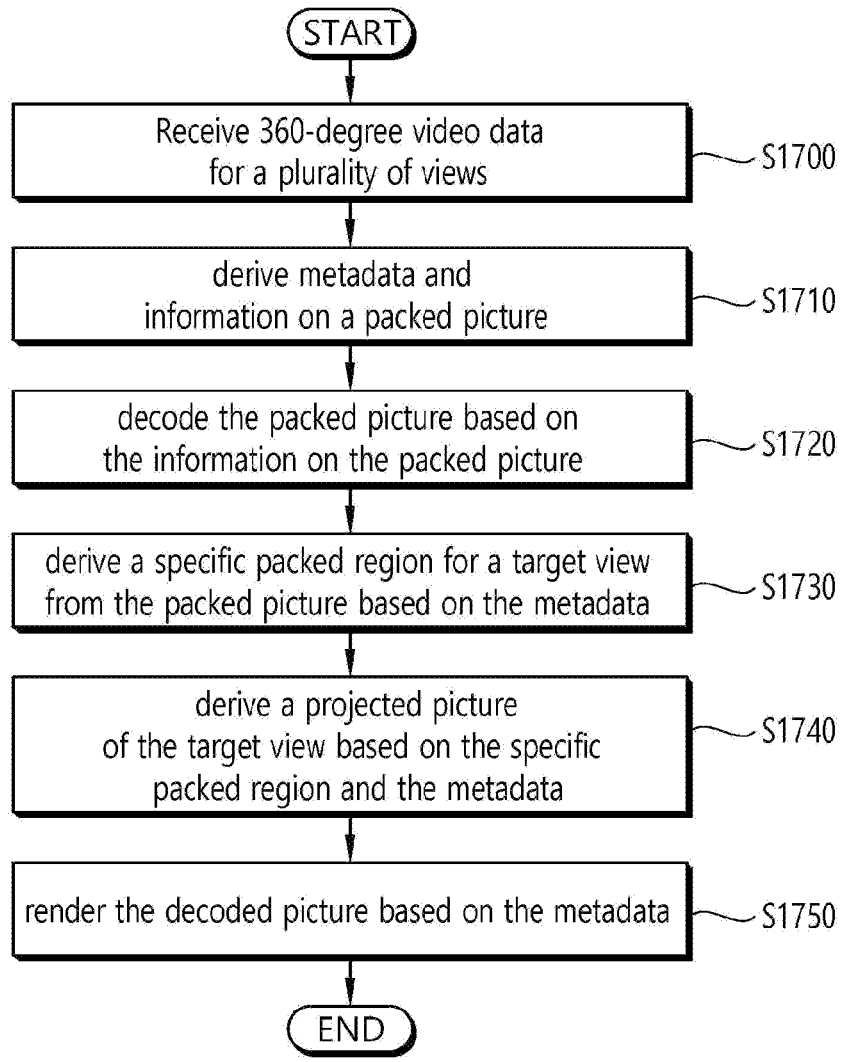
[Fig. 17]

[Fig. 18]
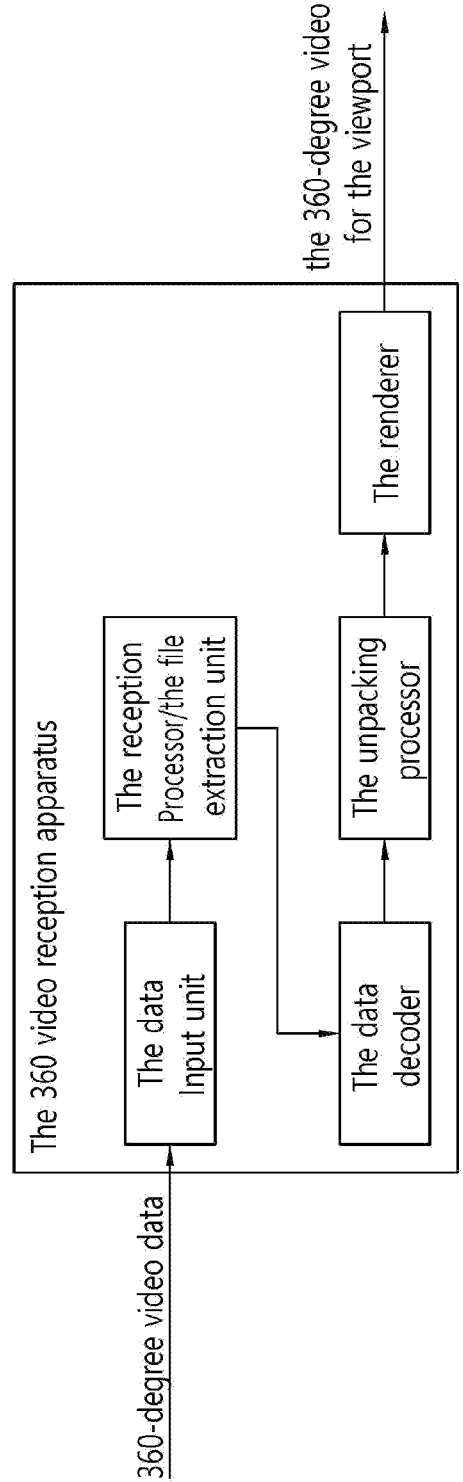

METHOD FOR TRANSMITTING 360-DEGREE VIDEO, METHOD FOR RECEIVING 360-DEGREE VIDEO, APPARATUS FOR TRANSMITTING 360-DEGREE VIDEO, AND APPARATUS FOR RECEIVING 360-DEGREE VIDEO

This application is the National Phase of PCT International Application No. PCT/KR2019/003939, filed on Apr. 3, 2019, which claims priority under 35 U.S.C. 119(e) to U.S. Provisional Application No. 62/653,527, filed on Apr. 5, 2018, which is hereby incorporated by reference herein in their entirety.

BACKGROUND OF THE INVENTION

Field of the Invention

The present invention relates to a 360-degree video and, more specifically, to methods and apparatus for transmitting and receiving a 360-degree video for a 3DoF+ content including multiview region-wise packing information.

Related Art

Virtual reality (VR) systems allow users to feel as if they are in electronically projected environments. Systems for providing VR can be improved in order to provide images with higher picture quality and spatial sounds. VR systems allow users to interactively consume VR content.

The 3DoF+(three Degrees of Freedom plus) content provides 3DoF or 360-degree video that is newly constructed according to the user's position movement through 360-degree video for a plurality of viewing positions/viewpoints. The 3DoF+ content allows user to consume various sensory experience.

SUMMARY OF THE INVENTION

Technical Objects

An object of the present invention is to provide a method and apparatus for improving VR video data transmission efficiency for providing a VR system.

Another object of the present invention is to provide a method and apparatus for transmitting VR video data and metadata with respect to VR video data.

Another object of the present invention is to provide a method and apparatus for improving 360-degree video data transmission efficiency for providing a 3DoF+ system.

Another object of the present invention is to provide a method and apparatus for transmitting metadata with respect to multiview region-wise packing information.

Technical Solutions

According to an embodiment of the present invention, a 360-degree video data processing method performed by a 360-degree video transmission apparatus is provided. The method includes: acquiring 360-degree video for a plurality of views; generating projected pictures for the views by processing the 360-degree video; generating a packed picture by packing the projected pictures; encoding the packed picture; generating metadata about the 360-degree video; and performing processing for storage or transmission of the encoded picture and the metadata, wherein the metadata includes multiview region-wise packing information, and wherein the multiview region-wise packing information includes information about a packed region in the packed picture and information about each of the views.

According to another embodiment of the present invention, a 360-degree video transmission apparatus for processing 360-degree video data is provided. The 360-degree video transmission apparatus includes: a data input unit configured to acquire 360-degree video for a plurality of views; a projection processor configured to generate projected pictures for the views by processing the 360-degree video; a packing processor configured to generate a packed picture by packing the projected pictures; an encoder configured to encode the packed picture; a metadata processor configured to generate metadata about the 360-degree video; and a transmission processor configured to perform processing for storage or transmission of the encoded picture and the metadata, wherein the metadata includes multiview region-wise packing information, and wherein the multiview region-wise packing information includes information about a packed region in the packed picture and information about each of the views.

According to another embodiment of the present invention, a 360-degree video data processing method performed by a 360-degree video reception apparatus is provided. The method includes: receiving 360-degree video data for a plurality of views; deriving metadata and information on a packed picture; decoding the packed picture based on the information on the packed picture; deriving a specific packed region for a target view from the packed picture based on the metadata; deriving a projected picture of the target view based on the specific packed region and the metadata; and rendering the projected picture based on the metadata, wherein the metadata includes multiview region-wise packing information, and wherein the multiview region-wise packing information includes information about a packed region in the packed picture and information about the target view.

According to another embodiment of the present invention, a 360-degree video reception apparatus for processing 360-degree video data is provided. The 360-degree video reception apparatus includes: a receiver configured to receive 360-degree video data for a plurality of views; a reception processor/a file extraction unit configured to derive metadata and information on a packed picture; a data decoder configured to decode the packed picture based on the information on the packed picture; a packing processor configured to derive a specific packed region for a target view from the packed picture based on the metadata, derive a projected picture of the target view based on the specific packed region and the metadata; and a renderer configured to render the projected picture based on the metadata, wherein the metadata includes multiview region-wise packing information, and wherein the multiview region-wise packing information includes information about a packed region in the packed picture and information about the target view.

Effects of the Invention

According to the present invention, it is possible to efficiently transmit 3DoF+ content in an environment supporting next-generation hybrid broadcast using terrestrial broadcast networks and the Internet.

According to the present invention, it is possible to propose a method for providing interactive experience in 3DoF+ content consumption of users.

According to the present invention, it is possible to propose a signaling method for correctly reflecting the intention of a 3DoF+ content provider in 360-degree content consumption of users.

According to the present invention, it is possible to propose a method for efficiently increasing transmission capacity and forwarding necessary information in 3DoF+ content transmission.

According to the present invention, it is possible to propose a method for providing interactive experience in 3DoF+ content consumption of users by supporting head motion parallax.

According to the present invention, a packed picture containing components for a plurality of views may be generated by the multiview region-wise packing. Accordingly, bit efficiency of the 3DoF+ content may be increased by eliminating redundant information between views.

BRIEF DESCRIPTION OF DRAWINGS

FIG. 1 is a view illustrating overall architecture for providing a 360-degree video according to the present invention.

FIGS. 2 and 3 are views illustrating a structure of a media file according to an embodiment of the present invention.

FIG. 4 illustrates an example of the overall operation of a DASH based adaptive streaming model.

FIG. 5 illustrates a 3DoF+ VR system.

FIG. 6 is a view illustrating overall architecture for providing a 3DoF+ video according to the present invention.

FIG. 7 illustrates overall architecture for providing a 360 degree content/3DoF+ content performed by the 360-degree video transmission apparatus/360-degree video reception apparatus.

FIG. 8 is a view schematically illustrating a configuration of a 360 video transmission apparatus to which the present invention is applicable.

FIG. 9 is a view schematically illustrating a configuration of a 360 video reception apparatus to which the present invention is applicable.

FIG. 10 illustrates overall architecture for providing a 3DoF content/3DoF+ content in which the multiview region-wise packing information are used.

FIG. 11 illustrates an example of a pre-encoding process of multiview region-wise packing with texture, residual, and depth map of multi-views.

FIG. 12 illustrates an example of post-decoder process of the multiview region-wise packing.

FIG. 13 illustrates an example of decoding process of multi-view region-wise packing with texture, residual, and depth map for a view B of a viewpoint A.

FIGS. 14a and 14b illustrate examples of the multiview region-wise packing process for a video including multiple views.

FIG. 15 schematically illustrates a 360 video data processing method performed by a 360 video transmission apparatus according to the present invention.

FIG. 16 schematically illustrates a 360 video transmission apparatus for performing a 360 video data processing method according to the present invention.

FIG. 17 schematically illustrates a 360 video data processing method performed by a 360 video reception apparatus according to the present invention.

FIG. 18 schematically illustrates a 360 video reception apparatus for performing a 360 video data processing method according to the present invention.

DESCRIPTION OF EXEMPLARY EMBODIMENTS

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, preferred embodiments of the present invention will be described in more detail with reference to the attached drawings. Hereinafter, the same reference numbers will be used throughout this specification to refer to the same components and redundant description of the same component will be omitted.

FIG. 1 is a view illustrating overall architecture for providing a 360-degree video according to the present invention.

The present invention proposes a method of providing 360-degree content in order to provide virtual reality (VR) to users. VR may refer to technology for replicating actual or virtual environments or those environments. VR artificially provides sensory experience to users and thus users can experience electronically projected environments.

360 content refers to content for realizing and providing VR and may include a 360 video and/or 360 audio. The 360 video may refer to video or image content which is necessary to provide VR and is captured or reproduced omnidirectionally (360 degrees). Hereinafter, the 360 video may refer to 360-degree video. A 360 video may refer to a video or an image represented on 3D spaces in various forms according to 3D models. For example, a 360 video can be represented on a spherical surface. The 360 audio is audio content for providing VR and may refer to spatial audio content whose audio generation source can be recognized to be located in a specific 3D space. 360 content may be generated, processed and transmitted to users and users can consume VR experiences using the 360 content.

Particularly, the present invention proposes a method for effectively providing a 360 video. To provide a 360 video, a 360 video may be captured through one or more cameras. The captured 360 video may be transmitted through series of processes and a reception side may process the transmitted 360 video into the original 360 video and render the 360 video. In this manner the 360 video can be provided to a user.

Specifically, processes for providing a 360 video may include a capture process, a preparation process, a transmission process, a processing process, a rendering process and/or a feedback process.

The capture process may refer to a process of capturing images or videos for a plurality of viewpoints through one or more cameras. Image/video data 110 shown in FIG. 1 may be generated through the capture process. Each plane of 110 in FIG. 1 may represent an image/video for each viewpoint. A plurality of captured images/videos may be referred to as raw data. Metadata related to capture can be generated during the capture process.

For capture, a special camera for VR may be used. When a 360 video with respect to a virtual space generated by a computer is provided according to an embodiment, capture through an actual camera may not be performed. In this case, a process of simply generating related data can substitute for the capture process.

The preparation process may be a process of processing captured images/videos and metadata generated in the capture process. Captured images/videos may be subjected to a stitching process, a projection process, a region-wise packing process and/or an encoding process during the preparation process.

First, each image/video may be subjected to the stitching process. The stitching process may be a process of connecting captured images/videos to generate one panorama image/video or spherical image/video.

Subsequently, stitched images/videos may be subjected to the projection process. In the projection process, the stitched images/videos may be projected on 2D image. The 2D image may be called a 2D image frame according to context. Projection on a 2D image may be referred to as mapping to a 2D image. Projected image/video data may have the form of a 2D image 120 in FIG. 1.

Video data projected on the 2D image may be subjected to the region-wise packing process in order to improve video coding efficiency. Region-wise packing may refer to a process of processing video data projected on a 2D image for each region. Here, regions may refer to divided areas of a 2D image. Regions can be obtained by dividing a 2D image equally or arbitrarily according to an embodiment. Further, regions may be divided according to a projection scheme in an embodiment. The region-wise packing process is an optional process and may be omitted in the preparation process.

The processing process may include a process of rotating regions or rearranging the regions on a 2D image in order to improve video coding efficiency according to an embodiment. For example, it is possible to rotate regions such that specific sides of regions are positioned in proximity to each other to improve coding efficiency.

The processing process may include a process of increasing or decreasing resolution for a specific region in order to differentiate resolutions for regions of a 360 video according to an embodiment. For example, it is possible to increase the resolution of regions corresponding to relatively more important regions in a 360 video to be higher than the resolution of other regions. Video data projected on the 2D image or region-wise packed video data may be subjected to the encoding process through a video codec.

According to an embodiment, the preparation process may further include an additional editing process. In this editing process, editing of image/video data before and after projection may be performed. In the preparation process, metadata regarding stitching/projection/encoding/editing may also be generated. Further, metadata regarding an initial viewpoint or a region of interest (ROI) of video data projected on the 2D image may be generated.

The transmission process may be a process of processing and transmitting image/video data and metadata which have passed through the preparation process. Processing according to an arbitrary transmission protocol may be performed for transmission. Data which has been processed for transmission may be delivered through a broadcast network and/or a broadband. Such data may be delivered to a reception side in an on-demand manner. The reception side may receive the data through various paths.

The processing process may refer to a process of decoding received data and re-projecting projected image/video data on a 3D model. In this process, image/video data projected on the 2D image may be re-projected on a 3D space. This process may be called mapping or projection according to context. Here, 3D model to which image/video data is mapped may have different forms according to 3D models. For example, 3D models may include a sphere, a cube, a cylinder and a pyramid.

According to an embodiment, the processing process may additionally include an editing process and an up-scaling process. In the editing process, editing of image/video data before and after re-projection may be further performed. When the image/video data has been reduced, the size of the image/video data can be increased by up-scaling samples in the up-scaling process. An operation of decreasing the size through down-scaling may be performed as necessary.

The rendering process may refer to a process of rendering and displaying the image/video data re-projected on the 3D space. Re-projection and rendering may be combined and represented as rendering on a 3D model. An image/video re-projected on a 3D model (or rendered on a 3D model) may have a form 130 shown in FIG. 1. The form 130 shown in FIG. 1 corresponds to a case in which the image/video is re-projected on a 3D spherical model. A user can view a region of the rendered image/video through a VR display. Here, the region viewed by the user may have a form 140 shown in FIG. 1.

The feedback process may refer to a process of delivering various types of feedback information which can be acquired in a display process to a transmission side. Interactivity in consumption of a 360 video can be provided through the feedback process. According to an embodiment, head orientation information, viewport information representing a region currently viewed by a user, and the like can be delivered to a transmission side in the feedback process. According to an embodiment, a user may interact with an object realized in a VR environment. In this case, information about the interaction may be delivered to a transmission side or a service provider in the feedback process. According to an embodiment, the feedback process may not be performed.

The head orientation information may refer to information about the position, angle, motion and the like of the head of a user. Based on this information, information about a region in a 360 video which is currently viewed by the user, that is, viewport information, can be calculated.

The viewport information may be information about a region in a 360 video which is currently viewed by a user. Gaze analysis may be performed through the viewpoint information to check how the user consumes the 360 video, which region of the 360 video is gazed by the user, how long the region is gazed, and the like. Gaze analysis may be performed at a reception side and a result thereof may be delivered to a transmission side through a feedback channel. A device such as a VR display may extract a viewport region based on the position/direction of the head of a user, information on a vertical or horizontal field of view (FOY) supported by the device, and the like.

According to an embodiment, the aforementioned feedback information may be consumed at a reception side as well as being transmitted to a transmission side. That is, decoding, re-projection and rendering at the reception side may be performed using the aforementioned feedback information. For example, only a 360 video with respect to a region currently viewed by the user may be preferentially decoded and rendered using the head orientation information and/or the viewport information.

Here, a viewport or a viewport region may refer to a region in a 360 video being viewed by a user. A viewpoint is a point in a 360 video being viewed by a user and may refer to a center point of a viewport region. That is, a viewport is a region having a viewpoint at the center thereof, and the size and the shape of the region can be determined by an FOV which will be described later.

In the above-described overall architecture for providing a 360 video, image/video data which is subjected to the capture/projection/encoding/transmission/decoding/re-projection/rendering processes may be referred to as 360 video data. The term "360 video data" may be used as the concept including metadata and signaling information related to such image/video data.

To store and transmit media data such as the aforementioned audio and video data, a standardized media file format may be defined. According to an embodiment, a media file may have a file format based on ISO BMFF (ISO base media file format).

FIGS. 2 and 3 are views illustrating a structure of a media file according to an embodiment of the present invention.

The media file according to the present invention may include at least one box. Here, a box may be a data block or an object including media data or metadata related to media data. Boxes may be in a hierarchical structure and thus data can be classified and media files can have a format suitable for storage and/or transmission of large-capacity media data. Further, media files may have a structure which allows users to easily access media information such as moving to a specific point of media content.

The media file according to the present invention may include an ftyp box, a moov box and/or an mdat box.

The ftyp box (file type box) can provide file type or compatibility related information about the corresponding media file. The ftyp box may include configuration version information about media data of the corresponding media file. A decoder can identify the corresponding media file with reference to ftyp box.

The moov box (movie box) may be a box including metadata about media data of the corresponding media file. The moov box may serve as a container for all metadata. The moov box may be a highest layer among boxes related to metadata. According to an embodiment, only one moov box may be present in a media file.

The mdat box (media data box) may be a box containing actual media data of the corresponding media file. Media data may include audio samples and/or video samples. The mdat box may serve as a container containing such media samples.

According to an embodiment, the aforementioned moov box may further include an mvhd box, a trak box and/or an mvex box as lower boxes.

The mvhd box (movie header box) may include information related to media presentation of media data included in the corresponding media file. That is, the mvhd box may include information such as a media generation time, change time, time standard and period of corresponding media presentation.

The trak box (track box) can provide information about a track of corresponding media data. The trak box can include information such as stream related information, presentation related information and access related information about an audio track or a video track. A plurality of trak boxes may be present depending on the number of tracks.

The trak box may further include a tkhd box (track head box) as a lower box. The tkhd box can include information about the track indicated by the trak box. The tkhd box can include information such as a generation time, a change time and a track identifier of the corresponding track.

The mvex box (movie extend box) can indicate that the corresponding media file may have a moof box which will be described later. To recognize all media samples of a specific track, moof boxes may need to be scanned.

According to an embodiment, the media file according to the present invention may be divided into a plurality of fragments (200). Accordingly, the media file can be fragmented and stored or transmitted. Media data (mdat box) of the media file can be divided into a plurality of fragments and each fragment can include a moof box and a divided mdat box. According to an embodiment, information of the ftyp box and/or the moov box may be required to use the fragments.

The moof box (movie fragment box) can provide metadata about media data of the corresponding fragment. The moof box may be a highest-layer box among boxes related to metadata of the corresponding fragment.

The mdat box (media data box) can include actual media data as described above. The mdat box can include media samples of media data corresponding to each fragment corresponding thereto.

According to an embodiment, the aforementioned moof box may further include an mfhd box and/or a traf box as lower boxes.

The mfhd box (movie fragment header box) can include information about correlation between divided fragments. The mfhd box can indicate the order of divided media data of the corresponding fragment by including a sequence number. Further, it is possible to check whether there is missed data among divided data using the mfhd box.

The traf box (track fragment box) can include information about the corresponding track fragment. The traf box can provide metadata about a divided track fragment included in the corresponding fragment. The traf box can provide metadata such that media samples in the corresponding track fragment can be decoded/reproduced. A plurality of traf boxes may be present depending on the number of track fragments.

According to an embodiment, the aforementioned traf box may further include a tfhd box and/or a trun box as lower boxes.

The tfhd box (track fragment header box) can include header information of the corresponding track fragment. The tfhd box can provide information such as a basic sample size, a period, an offset and an identifier for media samples of the track fragment indicated by the aforementioned traf box.

The trun box (track fragment run box) can include information related to the corresponding track fragment. The trun box can include information such as a period, a size and a reproduction time for each media sample.

The aforementioned media file and fragments thereof can be processed into segments and transmitted. Segments may include an initialization segment and/or a media segment.

A file of the illustrated embodiment 210 may include information related to media decoder initialization except media data. This file may correspond to the aforementioned initialization segment, for example. The initialization segment can include the aforementioned ftyp box and/or moov box.

A file of the illustrated embodiment 220 may include the aforementioned fragment. This file may correspond to the aforementioned media segment, for example. The media segment may further include a styp box and/or a sidx box.

The styp box (segment type box) can provide information for identifying media data of a divided fragment. The styp box can serve as the aforementioned ftyp box for a divided fragment. According to an embodiment, the styp box may have the same format as the ftyp box.

The sidx box (segment index box) can provide information indicating an index of a divided fragment. Accordingly, the order of the divided fragment can be indicated.

According to an embodiment 230, an ssix box may be further included. The ssix box (sub-segment index box) can provide information indicating an index of a sub-segment when a segment is divided into sub-segments.

Boxes in a media file can include more extended information based on a box or a FullBox as shown in the illustrated embodiment 250. In the present embodiment, a size field and a large size field can represent the length of the corresponding box in bytes. A version field can indicate the version of the corresponding box format. A type field can indicate the type or identifier of the corresponding box. A flags field can indicate a flag associated with the corresponding box.

Meanwhile, the fields (attributes) for 360 video of the present invention can be included and delivered in a DASH based adaptive streaming model.

FIG. 4 illustrates an example of the overall operation of a DASH based adaptive streaming model. The DASH based adaptive streaming model according to the illustrated embodiment 400 describes operations between an HTTP server and a DASH client. Here, DASH (Dynamic Adaptive Streaming over HTTP) is a protocol for supporting adaptive streaming based on HTTP and can dynamically support streaming according to network state. Accordingly, seamless AV content reproduction can be provided.

First, a DASH client can acquire an MPD. The MPD can be delivered from a service provider such as an HTTP server. The DASH client can send a request for corresponding segments to the server using information on access to the segments which is described in the MPD. Here, the request can be performed based on a network state.

Upon acquisition of the segments, the DASH client can process the segments in a media engine and display the processed segments on a screen. The DASH client can request and acquire necessary segments by reflecting a reproduction time and/or a network state therein in real time (adaptive streaming) Accordingly, content can be seamlessly reproduced.

The MPD (Media Presentation Description) is a file including detailed information for a DASH client to dynamically acquire segments and can be represented in the XML format.

A DASH client controller can generate a command for requesting the MPD and/or segments based on a network state. Further, this controller can control an internal block such as the media engine to be able to use acquired information.

An MPD parser can parse the acquired MPD in real time. Accordingly, the DASH client controller can generate the command for acquiring necessary segments.

The segment parser can parse acquired segments in real time. Internal blocks such as the media block can perform specific operations according to information included in the segments.

An HTTP client can send a request for a necessary MPD and/or segments to the HTTP server. In addition, the HTTP client can transfer the MPD and/or segments acquired from the server to the MPD parser or a segment parser.

The media engine can display content on a screen using media data included in segments. Here, information of the MPD can be used.

A DASH data model may have a hierarchical structure 410. Media presentation can be described by the MPD. The MPD can describe a temporal sequence of a plurality of periods which forms the media presentation. A period can represent one period of media content.

In one period, data can be included in adaptation sets. An adaptation set may be a set of a plurality of exchangeable media content components. Adaptation can include a set of representations. A representation can correspond to a media content component. Content can be temporally divided into a plurality of segments within one representation. This may be for accessibility and delivery. To access each segment, the URL of each segment may be provided.

The MPD can provide information related to media presentation, and a period element, an adaptation set element and a representation element can respectively describe the corresponding period, adaptation set and representation. A representation can be divided into sub-representations, and a sub-representation element can describe the corresponding sub-representation.

Here, common attributes/elements can be defined. The common attributes/elements can be applied to (included in) adaptation sets, representations and sub-representations. The common attributes/elements may include an essential property and/or a supplemental property.

The essential property is information including elements regarded as essential elements in processing data related to the corresponding media presentation. The supplemental property is information including elements which may be used to process data related to the corresponding media presentation. According to an embodiment, when descriptors which will be described later are delivered through the MPD, the descriptors can be defined in the essential property and/or the supplemental property and delivered.

Meanwhile, the present invention provides a method for 3DoF+ (3 Degrees of Freedom plus) contents in addition to the aforementioned method for 360 video contents in order to provide experience of immersive media to the user.

In the aforementioned 3DoF (3 Degrees of Freedom) based VR system (i.e., the aforementioned 360 video content system), the user is provided with a visual/auditory experience with respect to different viewing orientations at the fixed position of the user. But, VR system for the 3DoF+ content aim to provide extended visual/auditory experience with respect to different viewing orientations at different viewpoints and viewing positions. In other words, the VR system for the 3DoF+ content may represent a system that provides 360 degree content rendered at a plurality of viewing positions at a plurality of locations (viewpoints).

The concept of a viewing position and a viewpoint which is additionally defined in the 3DoF+ VR system can be explained as following figure. The viewing position may be called a head position.

FIG. 5 illustrates a 3DoF+ VR system.

Specifically, FIG. 5(a) illustrates a plurality of viewpoints in which 360 video contents are provided in the 3DoF+ VR system. For example, as shown in FIG. 5(a), a plurality of specific positions in a specific space (e.g., a theater, a stadium, etc.) may be considered as viewpoints in which the 360 video content is provided. In this case, it can be assumed that the video/audio provided in each of the viewpoints existing in the same specific space has the same time flow.

Meanwhile, a specific viewpoint may be rendered with 360 contents for a plurality of viewing positions. Thus, different visual/auditory experiences may be provided according to the user's head motion at the particular viewpoint. Here, the 360 contents may be called 3DoF+ contents, and the 3DoF+ contents may include 3DoF+ video and 3DoF+ audio.

FIG. 5(b) illustrates 3D spaces of a plurality of viewing positions. Here, the 3D space may be a sphere. Different visual/auditory experiences can be provided according to the user's head motion at the specific view point, so that video/audio/text information reflecting the relative position of each viewing position is provided.

In addition, video/audio information for an omnidirectional media at a specific viewing position may be transmitted as in the existing method for 360 content. In other words, the 360 content for the specific viewing position may be rendered in 3D space for the specific viewing position. In this case, not only a main source including video/audio/text/etc but also various additional sources may be transmitted to integrate. In addition, as another example, information for the additional sources may be transmitted in connection with the viewing orientation of the user or independently.

FIG. 5(c) illustrates a 3D space in which a 360 degree video of a viewing position is rendered. As shown in FIG. 5(c), each point on the spherical surface can be represented using r (the radius of a sphere), θ (rotation direction and degree based on z-axis) and φ (rotation direction and degree toward z-axis of x-y plane) using the spherical coordinate system. According to an embodiment, the spherical surface may be consistent with the world coordinate system or the principal point of the front camera may be assumed to be a point (r, 0, 0) of the spherical surface.

Meanwhile, the concept of aircraft principal axes can be used to represent the position of each point on the spherical surface. That is, the content of aircraft principal axes can be used to describe a 3D space before projection or after reprojection and perform signaling therefor in the present invention. According to an embodiment, a method using the concept of X, Y and Z axes or spherical coordinates may be used.

An aircraft can freely rotate three-dimensionally. Axes constituting a three dimension are referred to as a pitch axis, a yaw axis and a roll axis. These may be referred to as a pitch, a yaw and a roll or a pitch direction, a yaw direction and a roll direction in the description.

The pitch axis can refer to an axis which is a base of a direction in which the front end of the aircraft rotates up and down. In the illustrated concept of aircraft principal axes, the pitch axis can refer to an axis which connects the wings of the aircraft.

The yaw axis can refer to an axis which is a base of a direction in which the front end of the aircraft rotates to the left and right. In the illustrated concept of aircraft principal axes, the yaw axis can refer to an axis which connects the top to the bottom of the aircraft. The roll axis can refer to an axis which connects the front end to the tail of the aircraft in the illustrated concept of aircraft principal axes, and a rotation in the roll direction can refer to a rotation based on the roll axis. As described above, a 3D space in the present invention can be described using the concept of the pitch, yaw and roll.

FIG. 6 is a view illustrating overall architecture for providing a 3DoF+ video according to the present invention.

Referring to FIG. 6, 3DoF+ video data and/or 3DoF+ audio data may be acquired. Specifically, HDCA (High Density Camera Array), Lenslet (microlens) camera, or the like may be used for capturing the 3DoF+ contents, or the 3DoF+ contents may be acquired through a new device designed for 3DoF+ video capture. The generated image/video data set according to the position of the camera used for capture, such as the acquired image 610 shown in FIG. 6, can be generated in a plurality of numbers. That is, a plurality of video/audio information according to a head motion at a plurality of positions can be obtained. In this case, the image information may include depth information as well as texture information. A plurality of information of different viewing positions according to different capture positions, such as the acquired image 610 shown in FIG. 6, can be obtained, respectively. In addition, a metadata indicating the internal/external set values of the camera may be generated during the capture process of the 3DoF+ contents. On the other hand, in the case of an image generated by a computer other than a camera, the capturing process may be replaced by the image generation process.

If the image acquisition process is performed, a composition process may be performed. The composition process is a process of composing the acquired image 610 obtained through a video/audio input device and an image (video/image etc.) obtained through external media, voice (audio/effect sound etc.) and text (caption, etc.) to include in the user experience.

A preprocessing process of the acquired image 610 may be a process of processing the captured image/video and the metadata delivered from the capturing process. The preprocessing process includes all types of pre-processes such as a stitching process, a color correction process, a projection process, a view segmentation process, and an encoding process.

Specifically, the stitching process may be a process of connecting captured images/videos to generate one panorama image/video or spherical image/video. Subsequently, stitched images/videos may be subjected to the projection process. In the projection process, the stitched images/videos may be projected on 2D image. The 2D image may be called a 2D image frame according to context. Projection on a 2D image may be referred to as mapping to a 2D image. Projected image/video data may have the form of a 2D image 620 in FIG. 6.

The view segmentation process may be a process of dividing into a primary view and a secondary view to improve the coding efficiency. For example, images mapped at each camera location can be separated into the primary view and the secondary view, and different resolutions can be applied to different views to improve video coding efficiency. Also, arrangement or resolution of mapping images may be applied differently within the primary view to improve coding efficiency. Also, the secondary view may not exist based on the capture environment. The secondary view may represent an image/video that is played in the movement process when the user moves from a primary view to another primary view. The secondary view may have a lower resolution than the primary view, but the same resolution may be applied as needed. Also, for example, a 360 video reception apparatus may newly generate the secondary view based on virtual information.

The preprocessing process may further include an editing process. The editing process may represent a process of eliminating the boundaries between regions of 360 video, reducing the color/brightness difference between regions of 360 video, or adding a visual effect of an image.

Also, the preprocessing process may further include a packing process of rearranging regions of an image, and an encoding process of compressing image information. A projected picture can be generated based on a plurality of projection images of different viewing positions, such as the projected picture 620 of FIG. 6.

Further, in the preprocessing process, editing of image/video data before and after projection can be further performed, and a metadata can be generated. For example, in the preprocessing process, a metadata for an initial viewing orientation, a user's initial position, and a region of interest (ROI) may be generated.

The delivery process illustrated in FIG. 6 may represent the process of processing and transmitting image/video data and metadata obtained in the preprocessing process. Processing according to an arbitrary transmission protocol may be performed for transmission of the image/video data and the metadata. Data which has been processed for transmission may be delivered through a broadcast network and/or a broadband. Such data may be delivered to a reception side in an on-demand manner. The reception side may receive the data through various paths.

A processing process may include a decoding process for decoding received image/video data and metadata, and a re-projection process of mapping/projecting the image/video data of a decoded projected picture into a 3D (three Dimension) model, a process of generating and composing of a virtual viewpoint. Here, 3D model or projection map to which image/video data is mapped may have different forms according to 3D models. For example, 3D models may include a sphere, a cube, a cylinder and a pyramid. Alternatively, 3D model or projection map may be a modified form model of a sphere, a cube, a cylinder or a pyramid, or may be a free-form model.

The process of generating and composing of a virtual viewpoint may represent a process of generating an image/video data that is played in the movement process when the user moves from a primary view to another primary view or a secondary view. In order to generate the virtual viewpoint, it may be necessary to process metadata delivered in the capture and the preprocessing process. In some cases, only a part of 360 image/video may be generated/composed at the virtual viewpoint.

According to an embodiment, the processing process may additionally include an editing process and an up-scaling process. In the editing process, editing of image/video data before and after re-projection may be further performed. When the image/video data has been reduced, the size of the image/video data can be increased by up-scaling samples in the up-scaling process. An operation of decreasing the size through down-scaling may be performed as necessary.

The rendering process may refer to a process of rendering and displaying the image/video data re-projected on the 3D space. Re-projection and rendering may be combined and represented as rendering on a 3D model. An image/video re-projected on a 3D model (or rendered on a 3D model) may have a form 630 shown in FIG. 6. The form 630 shown in FIG. 6 corresponds to a case in which the image/video is re-projected on a 3D spherical model. A user can view a region of the rendered image/video through a VR display. Here, the region viewed by the user may have a form 640 shown in FIG. 6.

The feedback process may refer to a process of delivering various types of feedback information which can be acquired in a display process to a transmission side. Interactivity in consumption of a 360 video can be provided through the feedback process. According to an embodiment, head orientation information, viewport information representing a region currently viewed by a user, and the like can be delivered to a transmission side in the feedback process. According to an embodiment, a user may interact with an object realized in a VR environment. In this case, information about the interaction may be delivered to a transmission side or a service provider in the feedback process. According to an embodiment, the feedback process may not be performed.

FIG. 7 illustrates overall architecture for providing a 360 degree content/3DoF+ content performed by the 360-degree video transmission apparatus/360-degree video reception apparatus.

Referring to FIG. 7, a real-world audio-visual scene (A) may be captured by audio sensors as well as a set of cameras or a camera device with multiple lenses and sensors. The acquisition may result in a set of digital image/video (Bi) and audio (B a) signals. The cameras/lenses typically may cover all directions around the centre point of the camera set or camera device, thus the name of 360-degree video.

The images (Bi) of the same time instance may be stitched, possibly rotated, projected, and mapped onto a packed picture (D).

The packed pictures (D) may be encoded as coded images (Ei) or a coded video bitstream (Ev). The captured audio (Ba) may be encoded as an audio bitstream (Ea). The coded images, video, and/or audio may be then composed into a media file for file playback (F) or a sequence of an initialization segment and media segments for streaming (Fs), according to a particular media container file format. In this document, the media container file format may be the ISO Base Media File Format specified in ISO/IEC 14496-12. The file encapsulator also may include metadata into the file or the segments, such as projection and region-wise packing information assisting in rendering the decoded packed pictures.

The segments Fs may be delivered using a delivery mechanism to a player.

The file that the file encapsulator outputs (F) may be identical to the file that the file decapsulator inputs (F'). A file decapsulator may process the file (F') or the received segments (F's) and extract the coded bitstreams (E'a, E'v, and/or E'i) and parse the metadata. The audio, video, and/or images may be then decoded into decoded signals (B'a for audio, and D' for images/video). The decoded packed pictures (D') may be projected onto the screen of a head-mounted display or any other display device based on the current viewing orientation or viewport and the projection, spherical coverage, rotation, and region-wise packing metadata parsed from the file. Likewise, decoded audio (B'a) may be rendered, e.g. through headphones, according to the current viewing orientation. The current viewing orientation may be determined by the head tracking and possibly also eye tracking functionality. Besides being used by the renderer to render the appropriate part of decoded video and audio signals, the current viewing orientation may also be used by the video and audio decoders for decoding optimization.

The process described above is applicable to both live and on-demand use cases.

FIG. 8 is a view schematically illustrating a configuration of a 360 video transmission apparatus to which the present invention is applicable.

The 360 video transmission apparatus according to the present invention can perform operations related the above-described preparation process and the transmission process. The 360 video transmission apparatus may include a data input unit, a composition information processor, a stitcher, a projection processor, a (region-wise) packing processor, a sub picture processor, a data encoder, an encapsulation processor, a file extraction unit, a transmission processor, a transmitter, a viewpoint/viewing position/viewing orientation information and metadata processor and/or a (transmission side) feedback processor as internal/external elements. If an input data is a camera output image, the 360-degree video transmission apparatus can perform stitching to generate a sphere image (i.e., a 360-degree video rendered in 3D space) for each viewpoint/viewing position/viewing orientation. The viewpoint/viewing position/viewing orientation information and metadata processor may be referred to as a metadata processor.

The data input unit can receive captured images/videos for respective viewpoints. The images/videos for the respective viewpoints may be images/videos captured by one or more cameras. Further, data input unit may receive metadata generated in a capture process. The data input unit may forward the received images/videos for the viewpoints to the stitcher and forward metadata generated in the capture process to the signaling processor.

The stitcher can perform a stitching operation on the captured images/videos for the viewpoints. The stitcher may forward stitched 360 video data to the projection processor. The stitcher may receive necessary metadata from the metadata processor and use the metadata for the stitching operation as necessary. The stitcher may forward metadata generated in the stitching process to the metadata processor. The metadata in the stitching process may include information such as information representing whether stitching has been performed, and a stitching type.

The projection processor can project the stitched 360 video data on a 2D image. The projection processor may perform projection according to various schemes which will be described later. The projection processor may perform mapping in consideration of the depth of 360 video data for each viewpoint. The projection processor may receive metadata necessary for projection from the metadata processor and use the metadata for the projection operation as necessary. The projection processor may forward metadata generated in the projection process to the metadata processor. Metadata generated in the projection processor may include a projection scheme type and the like.

The (region-wise) packing processor can perform the aforementioned region-wise packing process. That is, the (region-wise) packing processor can perform the process of dividing the projected 360 video data into regions and rotating and rearranging regions or changing the resolution of each region. As described above, the (region-wise) packing processor is optional and thus t the (region-wise) packing processor may be omitted when region-wise packing is not performed. The (region-wise) packing processor may receive metadata necessary for region-wise packing from the metadata processor and use the metadata for a region-wise packing operation as necessary. The (region-wise) packing processor may forward metadata generated in the region-wise packing process to the metadata processor. Metadata generated in the (region-wise) packing processor may include a rotation degree, size and the like of each region.

The aforementioned stitcher, projection processor and/or the region-wise packing processor may be integrated into a single hardware component according to an embodiment.

According to an application, the sub picture processor can perform packing for making a plurality of images into an integrated image, or can generate a sub picture that divides an entire video into a video of details region. Further, when the input data includes video/audio/text additional information, information on a method of additionally displaying the additional information in a center image/video can be generated, and the information can be transmitted with the additional information.

The metadata processor can process metadata which may be generated in a capture process, a stitching process, a projection process, a region-wise packing process, an encoding process, an encapsulation process and/or a process for transmission. The metadata processor can generate 360 video related metadata using such metadata. According to an embodiment, the metadata processor may generate the 360 video related metadata in the form of a signaling table. 360 video related metadata may also be called metadata or 360 video related signaling information according to signaling context. Further, the metadata processor may forward the acquired or generated metadata to internal elements of the 360 video transmission apparatus as necessary. The metadata processor may forward the 360 video related metadata to the data encoder, the encapsulation processor and/or the transmission processor such that the 360 video related metadata can be transmitted to a reception side.

The data encoder can encode the 360 video data projected on the 2D image and/or region-wise packed 360 video data. The 360 video data can be encoded in various formats.

The encapsulation processor can encapsulate the encoded 360 video data and/or 360 video related metadata in a file format. Here, the 360 video related metadata may be received from the metadata processor. The encapsulation processor can encapsulate the data in a file format such as ISOBMFF, CFF or the like or process the data into a DASH segment or the like. The encapsulation processor may include the 360 video related metadata in a file format. The 360 video related metadata may be included in a box having various levels in SOBMFF or may be included as data of a separate track in a file, for example. According to an embodiment, the encapsulation processor may encapsulate the 360 video related metadata into a file. The transmission processor may perform processing for transmission on the encapsulated 360 video data according to file format. The transmission processor may process the 360 video data according to an arbitrary transmission protocol. The processing for transmission may include processing for delivery over a broadcast network and processing for delivery over a broadband. According to an embodiment, the transmission processor may receive 360 video related metadata from the metadata processor as well as the 360 video data and perform the processing for transmission on the 360 video related metadata.

The transmitter can transmit the 360 video data and/or the 360 video related metadata processed for transmission through a broadcast network and/or a broadband. The transmitter may include an element for transmission through a broadcast network and/or an element for transmission through a broadband.

According to an embodiment of the 360 video transmission apparatus according to the present invention, the 360 video transmission apparatus may further include a data storage unit (not shown) as an internal/external element. The data storage unit may store encoded 360 video data and/or 360 video related metadata before the encoded 360 video data and/or 360 video related metadata are delivered to the transmission processor. Such data may be stored in a file format such as ISOBMFF. Although the data storage unit may not be required when 360 video is transmitted in real time, encapsulated 360 data may be stored in the data storage unit for a certain period of time and then transmitted when the encapsulated 360 data is delivered over a broadband.

According to another embodiment of the 360 video transmission apparatus according to the present invention, the 360 video transmission apparatus may further include a (transmission side) feedback processor and/or a network interface (not shown) as internal/external elements. The network interface can receive feedback information from a 360 video reception apparatus according to the present invention and forward the feedback information to the transmission side feedback processor. The transmission side feedback processor can forward the feedback information to the stitcher, the projection processor, the region-wise packing processor, the data encoder, the encapsulation processor, the metadata processor and/or the transmission processor. According to an embodiment, the feedback information may be delivered to the metadata processor and then delivered to each internal element. Internal elements which have received the feedback information can reflect the feedback information in the following 360 video data processing.

According to another embodiment of the 360 video transmission apparatus according to the present invention, the region-wise packing processor may rotate regions and map the rotated regions on a 2D image. Here, the regions may be rotated in different directions at different angles and mapped on the 2D image. Region rotation may be performed in consideration of neighboring parts and stitched parts of 360 video data on a spherical surface before projection. Information about region rotation, that is, rotation directions, angles and the like may be signaled through 360 video related metadata. According to another embodiment of the 360 video transmission apparatus according to the present invention, the data encoder may perform encoding differently for respective regions. The data encoder may encode a specific region in high quality and encode other regions in low quality. The transmission side feedback processor may forward feedback information received from the 360 video reception apparatus to the data encoder such that the data encoder can use encoding methods differentiated for respective regions. For example, the transmission side feedback processor may forward viewport information received from a reception side to the data encoder. The data encoder may encode regions including an area indicated by the viewport information in higher quality (UHD and the like) than that of other regions.

According to another embodiment of the 360 video transmission apparatus according to the present invention, the transmission processor may perform processing for transmission differently for respective regions. The transmission processor may apply different transmission parameters (modulation orders, code rates, and the like) to the respective regions such that data delivered to the respective regions have different robustnesses.

Here, the transmission side feedback processor may forward feedback information received from the 360 video reception apparatus to the transmission processor such that the transmission processor can perform transmission processes differentiated for respective regions. For example, the transmission side feedback processor may forward viewport information received from a reception side to the transmission processor. The transmission processor may perform a transmission process on regions including an area indicated by the viewport information such that the regions have higher robustness than other regions.

The above-described internal/external elements of the 360 video transmission apparatus according to the present invention may be hardware elements. According to an embodiment, the internal/external elements may be changed, omitted, replaced by other elements or integrated.

FIG. 9 is a view schematically illustrating a configuration of a 360 video reception apparatus to which the present invention is applicable.

The 360 video reception apparatus according to the present invention can perform operations related to the above-described processing process and/or the rendering process. The 360 video reception apparatus may include a receiver, a reception processor/a file extraction unit, a decapsulation processor, a data decoder, a metadata parser, an unpacking/selection processor, a renderer, a composition processor, a (reception side) feedback processor and/or a re-projection processor as internal/external elements. A signaling parser may be called the metadata parser.

The receiver can receive 360 video data transmitted from the 360 video transmission apparatus according to the present invention. The receiver may receive the 360 video data through a broadcast network or a broadband depending on a channel through which the 360 video data is transmitted. The receiver may extract a necessary file after receiving the bitstream transmitted from the transmitter.

The reception processor can perform processing according to a transmission protocol on the received 360 video data. The reception processor may perform a reverse process of the process of the aforementioned transmission processor such that the reverse process corresponds to processing for transmission performed at the transmission side. The reception processor can forward the acquired 360 video data to the decapsulation processor and forward acquired 360 video related metadata to the metadata parser. The 360 video related metadata acquired by the reception processor may have the form of a signaling table.

The decapsulation processor can decapsulate the 360 video data in a file format received from the reception processor. The decapsulation processor can acquired 360 video data and 360 video related metadata by decapsulating files in ISOBMFF or the like. The decapsulation processor may select a video stream in the generated file format using viewpoint/viewing position/viewing orientation information and video metadata transmitted from the feedback processor, and the selected video stream may be reconstructed into video information through the decoder. The decapsulation processor can forward the acquired 360 video data to the data decoder and forward the acquired 360 video related metadata to the metadata parser. The 360 video related metadata acquired by the decapsulation processor may have the form of a box or a track in a file format. The decapsulation processor may receive metadata necessary for decapsulation from the metadata parser as necessary.

The data decoder can decode the 360 video data. The data decoder may receive metadata necessary for decoding from the metadata parser. The 360 video related metadata acquired in the data decoding process may be forwarded to the metadata parser.

In the case of a packed image, the unpacking/selection processor may perform unpacking of the packed image based on packing information transmitted through the metadata. If necessary, the unpacking/selection processor may perform a process of selecting a video and a necessary component suitable for a viewpoint/viewing position/viewing orientation transmitted from the feedback processor.

The metadata parser can parse/decode the 360 video related metadata. The metadata parser can forward acquired metadata to the data decapsulation processor, the data decoder, the re-projection processor and/or the renderer.

The re-projection processor can perform re-projection on the decoded 360 video data. The re-projection processor can re-project the 360 video data on a 3D space. The 3D space may have different forms depending on 3D models. The re-projection processor may receive metadata necessary for re-projection from the metadata parser. For example, the re-projection processor may receive information about the type of a used 3D model and detailed information thereof from the metadata parser. According to an embodiment, the re-projection processor may re-project only 360 video data corresponding to a specific area of the 3D space on the 3D space using metadata necessary for re-projection.

The renderer can render the re-projected 360 video data. As described above, re-projection of 360 video data on a 3D space may be represented as rendering of 360 video data on the 3D space. When two processes simultaneously occur in this manner, the re-projection processor and the renderer may be integrated and the renderer may perform the processes. According to an embodiment, the renderer may render only a part viewed by a user according to viewpoint information of the user.

In addition, the renderer can perform a rendering process of reconstructing a texture, a depth, and overlay information of the video into a format suitable for display. A composition process for integrating information of different layers may be performed prior to generating a final video, and an image suitable for a display viewport may be generated and displayed.

The user may view a part of the rendered 360 video through a VR display or the like. The VR display is a device which reproduces 360 video and may be included in a 360 video reception apparatus (tethered) or connected to the 360 video reception apparatus as a separate device (un-tethered).

According to an embodiment of the 360 video reception apparatus according to the present invention, the 360 video reception apparatus may further include a (reception side) feedback processor and/or a network interface (not shown) as internal/external elements. The reception side feedback processor can acquire feedback information from the renderer, the re-projection processor, the data decoder, the decapsulation processor and/or the VR display and process the feedback information. The feedback information may include viewport information, head orientation information, gaze information, and the like. The network interface can receive the feedback information from the reception side feedback processor and transmit the feedback information to a 360 video transmission apparatus.

As described above, the feedback information may be consumed at the reception side as well as being transmitted to the transmission side. The reception side feedback processor may forward the acquired feedback information to internal elements of the 360 video reception apparatus such that the feedback information is reflected in processes such as rendering. The reception side feedback processor can forward the feedback information to the renderer, the re-projection processor, the data decoder and/or the decapsulation processor. For example, the renderer can preferentially render an area viewed by the user using the feedback information. In addition, the decapsulation processor and the data decoder can preferentially decapsulate and decode an area being viewed or will be viewed by the user.

The above-described internal/external elements of the 360 video reception apparatus according to the present invention may be hardware elements. According to an embodiment, the internal/external elements may be changed, omitted, replaced by other elements or integrated. According to an embodiment, additional elements may be added to the 360 video reception apparatus.

Another aspect of the present invention may pertain to a method for transmitting a 360 video and a method for receiving a 360 video. The methods for transmitting/receiving a 360 video according to the present invention may be performed by the above-described 360 video transmission/reception apparatuses or embodiments thereof.

Embodiments of the above-described 360 video transmission/reception apparatuses and transmission/reception methods and embodiments of the internal/external elements of the apparatuses may be combined. For example, embodiments of the projection processor and embodiments of the data encoder may be combined to generate as many embodiments of the 360 video transmission apparatus as the number of cases. Embodiments combined in this manner are also included in the scope of the present invention.

Meanwhile, in a typical content flow process for an omnidirectional media application with projected video of 3DoF, the captured images compose a sphere, which provides viewport from a static viewpoint. Since the viewing position is assumed to be unchanged so it is not easy to provide interactivity between viewer and the VR environment. To provide different viewing experience with viewer's action in the VR environment, changing viewing position with a limitation of viewing boundary should be considered. The different view due to the different viewing position is called head motion parallax.

As described above, the head motion parallax could provide viewers certain degree of freedom of head motion with realistic viewing experience. To support the feature, the ideal content is consist of multiple spheres adjacent to the anchor (or center) sphere while the current content for 3DoF only considers a single sphere. As additional spherical information may be considered for subsidiary viewing positions, conventional content work flow of 3DoF service which is based on the single sphere content should be changed, such as image capture, projection, packing format, file encapsulation, delivery, file decapsulation, rendering process might be changed.

Accordingly, the present invention proposes multiple embodiments to support multiple spherical videos/images which represent different viewing position of a viewpoint. An embodiment includes multiview region-wise packing SEI message that inform a nested form of multiple spherical videos/images or additional information for correlated multiple spheres.

Here, the multiview region-wise packing may represent a process of packing projected pictures for a plurality of views into one picture. The view may represent eyeviews, viewing position or viewpoints, and each of the projected pictures may represent a picture in which a spherical video/image for a corresponding view is projected.

In addition, information on the nested form of multiple spherical videos/images and/or the additional information for the correlated multiple spheres be defined as ISOBMFF and/or OMAF. In addition, proposed syntaxes and semantics in the present invention could be defined in the parameter sets in the video level, such as VPS (Video Parameter Set), SPS (Sequence Parameter Set), and PPS (Picture Parameter Set). In the other words, the proposed syntaxes and semantics may be transmitted in the parameter sets of a video codec standards such as HEVC (High efficiency video coding) or VVC (Versatile Video Coding). Also, the proposed syntaxes and semantics may be transmitted through a digital wired/wireless interface, a file format in a system level, etc.

For example, multiview region-wise packing information of a current image/video and all of the related viewing positions may be defined in SEI message as shown in the following table.

TABLE 1

| | Descriptor |
|---|---|
| multiview_regionwise_packing( payloadSize ) { | |
|   multiview_regionwise_packing_id | u(12) |
|   multiview_regionwise_packing_cancel_flag | u(1) |
|   if( ! multiview_regionwise_packing_cancel_flag ) { | |
|     multiview_regionwise_packing_persistence_flag | u(1) |
|     constituent_picture_matching_flag | u(1) |
|     packing_format_matching_between_views_flag | u(1) |
|     num_view_minus1 | u(8) |
|     for( i = 0; i < = num_view_minus1; i++ ) { | |
|       mrwp_view_id[ i ] | u(8) |
|       mrwp_anchor_view_flag[ i ]      //or constrainton the case j equal to 0 | u(1) |
|       mrwp_view_independent_rotation_flag[ i ] | u(1) |
|       mrwp_component_independent_rotation_flag | u(1) |
|       mrwp_all_components_packed_in_one_region_flag[ i ] | u(1) |
|       mrwp_reserved_zero_4bits[ i ] | u(4) |
|       if( mrwp_anchor_view_flag[ i ] ) { | |
|         mrwp_location_anchor_view_x[ i ] | i(32) |
|         mrwp_location_anchor_view_y[ i ] | i(32) |
|         mrwp_location_anchor_view_z[ i ] | i(32) |
|         mrwp_rotation_anchor_view_yaw[ i ] | i(32) |
|         mrwp_rotation_anchor_view_pitch[ i ] | i(32) |
|         mrwp_rotation_anchor_view_roll[ i ] | i(32) |
|       } | |
|       else { | |
|         mrwp_location_diff_x[ i ] | i(32) |
|         mrwp_location_diff_y[ i ] | i(32) |
|         mrwp_location_diff_z[ i ] | i(32) |
|         if( mrwp_view_independent_rotation_flag[ i ] ) { | |
|           mrwp_rotation_diff_yaw[ i ] | i(32) |
|           mrwp_rotation_diff_pitch[ i ] | i(32) |
|           mrwp_rotation_diff_roll[ i ] | i(32) |
|         } | |
|       } | |
|       num_component_minus1[ i ] | u(8) |
|       for( j = 0; j < = num_component_minus1[ i ];j+= ) { | |
|         mrwp_component_id[ i ][ j ] | u(8) |
|         mrwp_component_type[ i ][ j ]    // texture(L,R), depth, residual, alpha | u(4) |
|         mrwp_projection_type[ i ][ j ]    // crp, cmp, ... | u(4) |
|         mrwp_proj_picture_width[ i ][ j ] | u(32) |
|         mrwp_proj_picture_height[ i ][ j ] | u(32) |
|         mrwp_coverage_horizontal[ i ][ j ] | u(32) |
|         mrwp_coverage_vertical[ i ][ j ] | u(32) |
|         if( mrwp_component_type[ i ][ j ] == 2 ) { | |
|           depth_near[ i ][ j ] | u(32) |
|           depth_far[ i ][ j ] | u(32) |
|         } | |
|         ( mrwp_component_dependent_rotation_flag[ i ] ) | |
|           mrwp_rotation_component_diff_yaw[ i ][ j ] | i(32) |
|           mrwp_rotation_component_diff_pitch[ i ][ j ] | i(32) |
|           mrwp_rotation_component_diff_roll[ i ][ j ] | i(32) |
|         } | |
|       } | |
|       if( mrwp_all_components_packed_in_one_region_flag[ i ] ) { | |
|         mrwp_packed_region_width[ i ][ j ] | u(16) |
|         mrwp_packed_region_height[ i ][ j ] | u(16) |
|         mrwp_packed_region_top[ i ][ j ] | u(16) |
|         mrwp_packed_region_left[ i ][ j ] | u(16) |
|       } | |
|     } | |
|     num_packed_regions | u(8) |
|     packed_picture_width | u(16) |
|     packed_picture_height | u(16) |
|     for( i = 0; i < num packed regions; i++ ) { | |
|       num_view_id_minus1[ i ]    // regions sharing among diff. views | u(8) |
|       for( j = 0; j < num_view_id_minus1[ i ]; i++ ) { | |
|         view_idx[ i ][ j ]    // mrwp_view_id[ i ] | u(8) |
|         num_component_id_minus1[ i ][ i ]  //region sharing between LR | u(8) |
|         for( k = 0; k <= num_component_id_minus_1[ i ][ j ]; k++ ) { | |
|           component_idx[ i ][ j ][ k ]    // mrwp_component_id[ i ][ j ] | u(8) |
|           proj_region_width[ i ][ j ][ k ] | u(32) |

TABLE 1-continued

|  | Descriptor |
|---|---|
|         proj_region_height[ i ][ j ][ k ] | u(32) |
|         proj_region_top[ i ][ j ][ k ] | u(32) |
|         proj_region_left[ i ][ j ][ k ] | u(32) |
|       } |  |
|   } |  |
|   rwp_reserved_zero_4bits[ i ] | u(4) |
|   rwp_transform_type[ i ] | u(3) |
|   rwp_guard_band_flag[ i ] | u(1) |
|   packed_region_width[ i ] | u(16) |
|   packed_region_height[ i ] | u(16) |
|   packed_region_top[ i ] | u(16) |
|   packed_region_left[ i ] | u(16) |
|   if( rwp_guard_band_flag[ i ] ) { |  |
|     rwp_left_guard_band_width[ i ] | u(8) |
|     rwp_right_guard_band_width[ i ] | u(8) |
|     rwp_top_guard_band_height[ i ] | u(8) |
|     rwp_bottom_guard_band_height[ i ] | u(8) |
|     rwp_guard_band_not_used_for_pred_flag[ i ] | u(1) |
|     for( j = 0; j < 4;j++ ) |  |
|     rwp_guard_band_type[ i ][ j ] | u(3) |
|     rwp_guard_band_reserved_zero_3bits[ i ] | u(3) |
|   } |  |
| } |  |
| } |  |
| } |  |

Referring to Table 1, multiview regionwise packing may represent multiview region-wise packing SEI message. The multiview region-wise packing SEI message may provide information to enable remapping of the colour samples of the cropped decoded pictures onto projected pictures as well as information on the location and size of the guard bands.

Referring to Table 1, the multiview region-wise packing information may include a multiview_regionwise_packing_id field and/or a multiview_regionwise_packing_cancel_flag field.

The multiview_regionwise_packing_id field may indicate an identifying number that may be used to identify the purpose of the multiview region-wise packing. For example, the value of the multiview_regionwise_packing_id field may be used to indicate the different use cases of this SEI message, to support different receiver capabilities, or to indicate sub-pictures which could be used to construct sphere image, panoramic image, multiview image, or multi-viewpoint image, etc.

Specifically, when multiview region-wise packing SEI messages are present with the same value of the multiview_regionwise_packing_id field, the content of these multiview region-wise packing SEI messages may be the same. When multiview region-wise packing SEI messages are present that have more than one value of the multiview_regionwise_packing_id field, this may indicate that the information indicated by the different values of the multiview_regionwise_packing_id field are alternatives that are provided for different purposes or that a cascading of correction to be applied in a sequential order (an order might be specified depending on the application). The value of the multiview_regionwise_packing_id field may be in the range of 0 to $2^{12}-1$, inclusive.

The multiview_regionwise_packing_cancel_flag field may indicate whether the multiview region-wise packing SEI message cancels the persistence of previous multiview region-wise packing SEI message in output order that applies to the current layer. For example, the multiview_regionwise_packing_cancel_flag field equal to 1 indicates that the multiview region-wise packing SEI message cancels the persistence of previous multiview region-wise packing SEI message in output order that applies to the current layer. The multiview_regionwise_packing_cancel_flag field equal to 0 indicates that multiview region-wise packing information follows.

Referring to Table 1, the multiview region-wise packing information may include a multiview_regionwise_packing_persistence_flag field, a constituent_picture_matching_flag field, and/or a packing_format_matching_between_views_flag field.

The multiview_regionwise_packing_persistence_flag field may specify the persistence of the multiview region-wise packing SEI message for the current layer. For example, the multiview_regionwise_packing_persistence_flag field equal to 0 specifies that the multiview region-wise packing information applies to the current decoded picture only. Here, the current decoded picture may also be called the current picture or the corresponding decoded picture.

Let picA be the current picture. The multiview_regionwise_packing_persistence_flag field to 1 specifies that the multiview region-wise packing information SEI message persists for the current layer in output order until any of the following conditions are true:
- A new CLVS of the current layer begins.
- The bitstream ends.
- A picture picB in the current layer in an access unit containing a multiview region-wise packing SEI message that is applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for the picture order count of picB.

The constituent_picture_matching_flag field may indicate whether projected region information, packed region information, and guard band region information in this SEI message apply the packed picture.

For example, the constituent_picture_matching_flag field equal to 1 may specify that the projected region information, the packed region information, and the guard band region information in this SEI message apply individually to each of constituent pictures. Here, the constituent pictures may represent a constituent picture of the packed picture and a constituent picture of the projected picture. Also, the packed picture and the projected picture may have the same stereoscopic frame packing format indicated by the frame packing arrangement SEI message. The constituent_picture_matching_flag field equal to 0 may specify that the projected region information, the packed region information, and the guard band region information in this SEI message apply to the projected picture.

Meanwhile, when StereoFlag field is equal to 0, or the StereoFlag field is equal to 1 and frame_packing_arrangement_type field is equal to 5, the value of the constituent_picture_matching_flag field may be equal to 0.

The packing_format_matching_between_views_flag field equal to 1 may specify that the packed picture have the same packing format per viewing position where the projection format is indicated by the mrwp_projection_type field. The packing_format_matching_between_views_flag field equal to 0 may specify that the different projection format is used for each viewing position. The viewing position may also be called a head position.

Referring to Table 1, the multiview region-wise packing information may include a num_view_minus1 field, a mrwp_view_id[i] field, a mrwp_anchor_view_flag[i] field, a mrwp_view_independent_rotation_flag field, a mrwp_all_components_in_one_packedregion_flag[i] field and/or a mrwp_reserved_zero_4bits[i] field.

The num_view_minus1 plus 1 field may specify a number of view considered in the SEI message. Here, the view may be an eye view, a viewing position and/or a viewpoint.

The mrwp_view_id[i] field may indicate an identifying number that may be used to identify the view. For example, the value of the mrwp_view_id[i] field may indicate an identifying number of an i-th view. In other words, the value of the mrwp_view_id[i] field may be used to indicate the i-th view. the mrwp_view_id[i] field could be used to indicate one or multiple regions for specific purposes, e.g., indication of sub-pictures corresponding to a head location that causes head motion parallax, or indication of sub-picture pair supporting binocular disparity of a head location, etc. Here, the head location may be called the viewing position.

The mrwp_anchor_view_flag[i] field may indicate whether the i-th view with the i-th mrwp_view_id is an anchor (or center or representative) view. For example, the mrwp_anchor_view_flag field equal to 1 may indicate that the i-th view with the i-th mrwp_view_id is the anchor view. The mrwp_anchor_view_flag field equal to 0 may indicate that the i-th view is a peripheral view.

The mrwp_view_independent_rotation_flag[i] field may indicate whether a rotation of the i-th view is different from a rotation of the anchor view. For example, the mrwp_view_independent_rotation_flag[i] field equal to 1 may indicate that the rotation of the i-th view is different from the rotation of the anchor view. The mrwp_view_independent_rotation_flag[i] field equal to 0 may indicate that the rotation of the i-th view is identical to the rotation of the anchor view.

The mrwp_all_components_in_one_packedregion_flag[i] field may indicate whether packed regions that consist a projected picture corresponds to the i-th view are packed exclusively in a rectangular region. For example, the mrwp_all_components_in_one_packedregion_flag[i] field equal to 1 may indicate that the packed regions that consist the projected picture corresponds to the i-th view are packed exclusively in the rectangular region. The mrwp_exclusive_packing_flag[i] field equal to 0 may indicate that the packed regions that corresponds to the i-th view are not packed within the rectangular region. In the other words, the mrwp_exclusive_packing_flag[i] field equal to 0 may indicate that the packed regions that corresponds to the i-th view are packed within a plurality of rectangular regions.

The mrwp_reserved_zero_4bits[i] field may be equal to 0. Other values for the mrwp_reserved_zero_4bits[i] field are reserved for future use. Decoders may ignore the value of mrwp_reserved_zero_4bits[i] field. Meanwhile, the mrwp_reserved_zero_5bits[i] field may be used instead of the mrwp_reserved_zero_4bits[i] field.

Referring to Table 1, the multiview region-wise packing information may include a mrwp_location_anchor_view_x[i] field, a mrwp_location_anchor_view_y[i] field, a mrwp_location_anchor_view_z[i] field, a mrwp_rotation_anchor_view_yaw[i] field, a mrwp_rotation_anchor_view_pitch[i] field and/or a mrwp_rotation_anchor_view_roll[i] field.

The mrwp_location_anchor_view_x[i] field, the mrwp_location_anchor_view_y[i] field and the mrwp_location_anchor_view_z[i] field may indicate a location of the i-th view related to the mrwp_view_id[i] field in the units of $2^{-16}$ millimeters. The range of the mrwp_location_anchor_view_x[i] field, the mrwp_location_anchor_view_y[i] field and the mrwp_location_anchor_view_z[i] field may be in the range of $-32768*2^{16}-1$ (i.e., $-2147483647$) to $32768*2^{16}$ (i.e., 2147483648), inclusive.

The mrwp_rotation_anchor_view_yaw[i] field, the mrwp_rotation_anchor_view_pitch[i] field, and the mrwp_rotation_anchor_view_roll[i] field may indicate yaw, pitch, and roll rotation angles, respectively, that is applied to the unit sphere of the i-th view related to the mrwp_view_id[i] field, the mrwp_location_anchor_view_x[i] field, the mrwp_location_anchor_view_y[i] field, and the mrwp_location_anchor_view_z[i] field to convert the local coordinate axes to the global coordinate axes, in units of $2^{-16}$ degrees. In other words, the mrwp_rotation_anchor_view_yaw[i] field, the mrwp_rotation_anchor_view_pitch[i] field, and the mrwp_rotation_anchor_view_roll[i] field may indicate a yaw angle, a pitch angle and a roll angle of a rotation for the i-th view. The value of the mrwp_rotation_anchor_view_yaw[i] field may be in the range of $-180*2^{16}$ (i.e., $-11796480$) to $180*2^{16}-1$ (i.e., 11796479), inclusive, the value of the mrwp_rotation_anchor_view_pitch[i] field may be in the range of $-90*2^{16}$ (i.e., $-5898240$) to $90*2^{16}$ (i.e., 5898240), inclusive, and the value of the mrwp_rotation_anchor_view_roll[i] field may be in the range of $-180*2^{16}$ (i.e., $-11796480$) to $180*2^{16}-1$ (i.e., 11796479), inclusive. The mrwp_rotation_anchor_view_yaw[i] field, the mrwp_rotation_anchor_view_pitch[i] field, and the mrwp_rotation_anchor_view_roll[i] field could be used to indicate an azimuth angle, an elevation angle, and a tilt angle of the rotation of the i-th view, respectively.

Referring to Table 1, the multiview region-wise packing information may include a mrwp_location_diff_x[i] field, a mrwp_location_diff_y[i] field, a mrwp_location_diff_z[i] field, a mrwp_rotation_diff_yaw[i] field, a mrwp_rotation_diff_pitch[i] field, and/or a mrwp_rotation_diff_roll[i] field.

The mrwp_location_diff_x[i] field, the mrwp_location_diff_y[i] field, and the mrwp_location_diff_z[i] field may indicate a location of the i-th view relative to the location of the anchor view in the units of $2^{-16}$ millimeters. The (x,y,z) location of the i-th view could be calculated by adding the mrwp_location_anchor_view_x[i] field and the mrwp_location_diff_x[i] field, the mrwp_location_anchor_view_y[i] field and the mrwp_location_diff_y[i] field, and the mrwp_location_anchor_view_z[i] field and the mrwp_location_diff_z[i] field, respectively. The range of the mrwp_location_diff_x[i] field, the mrwp_location_diff_y[i] field and the mrwp_location_diff_z[i] field may be in the range of $-32768*2^{16}-1$ (i.e., $-2147483647$) to $32768*2^{16}$ (i.e., 2147483648), inclusive.

The mrwp_rotation_diff_yaw[i] field, the mrwp_rotation_diff_pitch[i] field, and the mrwp_rotation_diff_roll[i] field may indicate yaw, pitch, and roll rotation angle of the i-th view relative to the anchor view in units of $2^{-16}$ degrees, respectively. In other words, the mrwp_rotation_diff_yaw[i] field, the mrwp_rotation_diff_pitch[i] field, and the mrwp_rotation_diff_roll[i] field may indicate a yaw angle, a pitch angle, and roll angle of a viewing orientation of the i-th view relative to the anchor view. The yaw, pitch, and roll rotation angles of the i-th view relative to the global coordinate could be calculated by adding the mrwp_rotation_diff_yaw[i] field and the mrwp_rotation_anchor_view_yaw[i] field, the mrwp_rotation_diff_pitch[i] field and the mrwp_rotation_anchor_view_pitch[i] field, and the mrwp_rotation_diff_roll[i] field and the mrwp_rotation_anchor_view_roll[i] field, respectively. They are applied to the unit sphere of the i-th view related to the mrwp_view_id[i] field, the mrwp_location_anchor_view_x[i] field, the mrwp_location_anchor_view_y[i] field, and the mrwp_location_anchor_view_z[i] field to convert the local coordinate axes to the global coordinate axes.

A value of the mrwp_rotation_diff_yaw[i] field may be in the range of $-180*2^{16}$ (i.e., $-11796480$) to $180*2^{16}-1$ (i.e., 11796479), inclusive, A value of the mrwp_rotation_diff_pitch[i] field may be in the range of $-90*2^{16}$ (i.e., $-5898240$) to $90*2^{16}$ (i.e., 5898240), inclusive, and A value of the mrwp_rotation_diff_roll[i] field may be in the range of $-180*2^{16}$ (i.e., $-11796480$) to $180*2^{16}-1$ (i.e., 11796479), inclusive. The mrwp_rotation_diff_yaw[i] field, the mrwp_rotation_diff_pitch[i] field, and the mrwp_rotation_diff_roll[i] field could be used to indicate an azimuth angle, an elevation angle, and a tilt angle, respectively.

Referring to Table 1, the multiview region-wise packing information may include a num_component_minus1[i] field, a mrwp_component_id[i][j] field, a mrwp_component_type[i][j] field, a mrwp_projection_type[i][j] field, a mrwp_proj_picture_width[i][j] field, a mrwp_proj_picture_height[i][j] field, a mrwp_coverage_horizontal[i][j] field and/or a mrwp_coverage_vertical[i][j] field.

The num_component_minus1[i] field may specify a number of components in the i-th view in the SEI message. Specifically, the num_component_minus1[i] field plus 1 may specify the number of the components in the i-th view considered in the SEI message.

The mrwp_component_id[i][j] field may specify an identifying number that may be used to identify a j-th component of the i-th view. In other words, the mrwp_component_id[i][j] field may specify the identifying number of the j-th component of the i-th view.

The mrwp_component_type[i][j] field may specify a type of the j-th component of the i-th view. For example, the mrwp_component_type[i][j] field equal to 0 may indicate the type of the j-th component is unspecified. The mrwp_component_type[i][j] field equal to 1 may indicate the j-th component is a video component. The mrwp_component_type[i][j] field equal to 2 may indicate the j-th component is a depth map. The mrwp_component_type[i][j] field equal to 3 may indicate the j-th component is an alpha channel. The mrwp_component_type[i][j] field equal to 4 may indicate the j-th component is a video component of the left-eye-view. The mrwp_component_type[i][j] field equal to 5 may indicate the j-th component is a video component of the right-eye-view. The mrwp_component_type[i][j] field equal to 6 may indicate the j-th component is a video component of both-eye-view. The mrwp_component_type[i][j] field equal to 7 may indicate the j-th component is a residual video component of the left-eye-view. The mrwp_component_type[i][j] field equal to 8 may indicate the j-th component is a residual video component of the right-eye-view. The mrwp_component_type[i][j] field equal to 9 may indicate the j-th component is a residual video component of both-eye-view. The value of the mrwp_component_type[i][j] field from 10 to 15 is reserved for future use. Here, a video component may be called a texture component.

The mrwp_projection_type[i][j] field may specify a type of the projection for the j-th component of the i-th view used in generating the projected picture from a 360 sphere (i.e., a sphere video/image or a 360-degree video). For example, the mrwp_projection_type[i][j] field equal to 0 may indicate the type of the projection for the j-th component of the i-th view is unspecified. The mrwp_projection_type[i][j] field equal to 1 may indicate the type of the projection for the j-th component of the i-th view is the equirectangular projection. The mrwp_projection_type[i][j] field equal to 2 may indicate the type of the projection for the j-th component of the i-th view is the cube map projection. The value of the mrwp_projection_type[i][j] field from 3 to 15 is reserved for future use.

The mrwp_proj_picture_width[i][j] field and the mrwp_proj_picture_height[i][j] field may specify the width and height of a region in the projected picture for the j-th component of the i-th view, in sample units, respectively. Here, the region is a region, that the j-th component of the i-th view is projected, in the projected picture. In other words, the region is a region including the j-th component of the i-th view in the projected picture. Values of the mrwp_proj_picture_width field and the mrwp_proj_picture_height field may both be greater than 0.

The mrwp_coverage_horizontal[i][j] field and the mrwp_coverage_vertical[i][j] field may specify horizontal range and vertical range of coverage of the j-th component of the i-th view, in units of $2^{-16}$ degrees, respectively.

Referring to Table 1, the multiview region-wise packing information may include a depth_near[i][j] field and/or a depth_far[i][j] field.

The depth_near[i][j] field and the depth_far[i][j] field may specify minimum distance and maximum distance from the image plane to objects of the j-th component of the i-th view, in units of $2^{-16}$ degrees, respectively. In other words, the depth_near[i][j] field and the depth_far[i][j] field may specify minimum depth value and maximum value of the j-th component of the i-th view, in units of $2^{-16}$ degrees, respectively. Here, the image plane may represent the projected picture for the j-th component of the i-th view.

Referring to Table 1, the multiview region-wise packing information may include a mrwp_rotation_component_diff_yaw[i][j] field, a mrwp_rotation_component_diff_pitch[i][j] field and/or a mrwp_rotation_component_diff_roll[i][j] field.

The mrwp_rotation_component_diff_yaw[i][j] field, the mrwp_rotation_component_diff_pitch[i][j] field, the mrwp_rotation_component_diff_roll[i][j] field may indicate yaw rotation angle difference, pitch rotation angle difference, and roll rotation angle difference of the j-th component of the i-th view relative to the reference rotation angle of the i-th view in units of $2^{-16}$ degrees, respectively. The yaw rotation angle, the pitch rotation angle, and the roll rotation angle of the j-th component of the i-th view relative to the global coordinate could be calculated by adding each difference values and the reference rotation angles, respectively. For example, The yaw rotation angle of the j-th component of the i-th view relative to the global coordinate may be calculated by adding the yaw rotation angle difference and the yaw reference rotation angle, the pitch rotation angle of the j-th component of the i-th view relative to the global coordinate may be calculated by adding the pitch rotation angle difference and the pitch reference rotation angle, and the roll rotation angle of the j-th component of the i-th view relative to the global coordinate may be calculated by adding the roll rotation angle difference and the roll reference rotation angle.

The value of the mrwp_rotation_component_diff_yaw[i] field may be in the range of $-180*2^{16}$ (i.e., −11796480) to $180*2^{16}-1$ (i.e., 11796479), inclusive, the value of the mrwp_rotation_component_diff_pitch[i] field may be in the range of $-90*2^{16}$ (i.e., −5898240) to $90*2^{16}$ (i.e., 5898240), inclusive, and the value of the mrwp_rotation_component_diff_roll[i] field may be in the range of $-180*2^{16}$ (i.e., −11796480) to $180*2^{16}-1$ (i.e., 11796479), inclusive. The mrwp_rotation_component_diff_yaw[i] field, the mrwp_rotation_component_diff_pitch[i] field, and mrwp_rotation_component_diff_roll[i] field could be used to indicate an azimuth angle, an elevation angle, and a tilt angle, respectively.

Referring to Table 1, the multiview region-wise packing information may include a mrwp_packed_region_width[i][j] field, a mrwp_packed_region_height[i][j] field, a mrwp_packed_region_top[i][j] field and/or a mrwp_packed_region_left[i][j] field.

The mrwp_packed_region_width[i][j] field, the mrwp_packed_region_height[i][j] field, the mrwp_packed_region_top[i][j] field and mrwp_packed_region_left[i][j] field may specify width, height, top sample row, and left-most sample column of a region in the packed picture or the constituent picture of the packed picture for the j-th component of the i-th view, in sample units, respectively. When a value of the constituent_picture_matching_flag field is equal to 0, the mrwp_packed_region_width[i][j] field, the mrwp_packed_region_height[i][j] field, the mrwp_packed_region_top[i][j] field and mrwp_packed_region_left[i][j] field may specify the width, the height, the top sample row, and the left-most sample column of the region in the packed picture of the packed picture for the j-th component of the i-th view, in sample units, respectively. When a value of the constituent_picture_matching_flag field is equal to 1, the mrwp_packed_region_width[i][j] field, the mrwp_packed_region_height[i][j] field, the mrwp_packed_region_top[i][j] field and mrwp_packed_region_left[i][j] field may specify the width, the height, the top sample row, and the left-most sample column of the region in the constituent picture of the packed picture of the packed picture for the j-th component of the i-th view, in sample units, respectively. Here, the region is a region, that the j-th component of the i-th view is projected, in the packed picture or the constituent picture of the packed picture. In other words, the region is a region including the j-th component of the i-th view in the packed picture or the constituent picture of the packed picture.

Referring to Table 1, the Multiview region-wise packing information may include a num_packed_regions field, a packed_picture_width field and/or a packed_picture_height field.

The num_packed_regions field may specify a number of packed regions when the value of the constituent_picture_matching_flag field is equal to 0. Also, the value of the num_packed_regions field may be greater than 0. Meanwhile, when the value of the constituent_picture_matching_flag field is equal to 1, the total number of packed regions may equal to the num_packed_regions field*2, and the information in each entry of the loop of the num_packed_regions field entries may apply to each constituent picture of the projected picture and the packed picture.

The packed_picture_width field and the packed_picture_height field may specify the width and height, respectively, of the packed picture, in relative packed picture sample units. Values of the packed_picture_width field and the packed_picture_height field may both be greater than 0.

It is a requirement of bitstream conformance that the packed_picture_width field and the packed_picture_height field may have such values that the packed_picture_width field is an integer multiple of cropPicWidth and the packed_picture_height field is an integer multiple of cropPicHeight, where the cropPicWidth and the cropPicHeight are the width and height, respectively, of the cropped decoded picture.

Referring to Table 1, the Multiview region-wise packing information may include a num_view_id_minus1[i] field.

The num_view_id_minus1[i] field may specify a number of view indicators describing an i-th packed region. For example, the num_view_id_minus1[i] field plus 1 specifies the number of view indicators describing the i-th packed region. The num_view_id_minus1[i] field greater than 1 could represent that the i-th packed region is shared with the different views.

Referring to Table 1, the multiview region-wise packing information may include a view_idx[i][j] field, a num_component_id_minus1[i][j] field, a component_idx[i][j][k] field, a proj_region_width[i][j][k] field, a proj_region_height[i][j][k] field, a proj_region_top[i][j][k] field and/or a proj_region_left[i][j][k] field.

The view_idx[i][j] field may specify a j-th view indicator which describes view information and projected picture information of the j-th view with regard to the i-th packed region. A value of the view_idx[i][j] field may be match with one of the values of the mrwp_view_id[i] field defined in the current SEI message. In other words, the view_idx[i][j] field and the mrwp_view_id[i] field may specify same view. So, the view information and the projected picture information described by the j-th view indicator may be view information and projected picture information of a view indicated by the mrwp_view_id[i] field.

The num_component_id_minus1[i][j] field may specify a number of component view indicators of j-th view describing the i-th packed region. For example, the num_component_id_minus1[i][j] field plus 1 specifies the number of component view indicators describing the i-th packed region. The num_component_id_minus1[i][j] field greater than 1 could represent that the i-th packed region is shared among the components of the j-th view.

The component_idx[i][j][k] field may specify a k-th component indicator of the j-th view which describes the component type, projection type and the size of the projected picture with regard to the i-th packed region. A value of component_idx[i][j][k] field may be match with one of the values of the mrwp_component_id[i][j] field defined in the current SEI message. In other words, the component_idx[i][j][k] field and the mrwp_component_id[i][j] field may specify same component.

The proj_region_width[i][j][k] field, the proj_region_height[i][j][k] field, the proj_region_top[i][j][k] field and the proj_region_left[i][j][k] field may specify width, height, top sample row, and left-most sample column, respectively, of an i-th projected region, either within the projected picture or within the constituent picture of the projected picture. When a value of the constituent_picture_matching_flag field is equal to 0, the proj_region_width[i][j][k] field, the proj_region_height[i][j][k] field, the proj_region_top[i][j][k] field and the proj_region_left[i][j][k] field may specify the width, the height, the top sample row, and the left-most sample column, respectively, of the i-th projected region within the projected picture. When the value of the constituent_picture_matching_flag field is equal to 1, the proj_region_width[i][j][k] field, the proj_region_height[i][j][k] field, the proj_region_top[i][j][k] field and the proj_region_left[i][j][k] field may specify the width, the height, the top sample row, and the left-most sample column, respectively, of the i-th projected region within the constituent picture of the projected picture. Here, the projected picture may represent the projected picture of the component of the viewing position indicated by the component_idx[i][j][k] field and the view_idx[i][j] field.

Meanwhile, the i-th projected region may correspond to the i-th packed region, the i-th packed region may be derived by the multiview region-wise packing for the i-th projected region. The proj_region_width[i][j][k] field, the proj_region_height[i][j][k] field, the proj_region_top[i][j][k] field, and the proj_region_left[i][j][k] field may be indicated in relative projected picture sample units. Also, two projected regions may partially or entirely overlap with each other.

Referring to Table 1, the multiview region-wise packing information may include a rwp_reserved_zero_4bits[i] field, a rwp_transform_type[i] field, a rwp_guard_band_flag[i] field, a packed_region_width[i] field, a packed_region_height[i] field, a packed_region_top[i] field and/or a packed_region_left[i] field.

The rwp_reserved_zero_4bits[i] field may be equal to 0 in bitstreams conforming to this version of this Specification. Other values for the rwp_reserved_zero_4bits[i] field are reserved for future use by ITU-TIISO/IEC. Decoders may ignore the value of the rwp_reserved_zero_4bits[i] field.

The rwp_transform_type[i] field may specify rotation and mirroring to be applied to the i-th packed region to remap to the i-th projected region. When the rwp_transform_type[i] field specifies both rotation and mirroring, the rotation applies before mirroring. Values of the rwp_transform_type[i] field are specified as follows.

For example, the rwp_transform_type[i] field equal to 0 may indicate that no transformation (i.e., rotation and mirroring) is used for the i-th packed region. The rwp_transform_type[i] field equal to 1 may indicate that the transformation applied to the i-th packed region is mirroring horizontally. The rwp_transform_type[i] field equal to 2 may indicate that the transformation applied to the i-th packed region is rotation by 180 degrees (anticlockwise). The rwp_transform_type[i] field equal to 3 may indicate that the transformation applied to the i-th packed region is rotation by 180 degrees (anticlockwise) after mirroring horizontally. The rwp_transform_type[i] field equal to 4 may indicate that the transformation applied to the i-th packed region is rotation by 90 degrees (anticlockwise) before mirroring horizontally. The rwp_transform_type[i] field equal to 5 may indicate that the transformation applied to the i-th packed region is rotation by 90 degrees (anticlockwise). The rwp_transform_type[i] field equal to 6 may indicate the transformation applied to the i-th packed region is rotation by 270 degrees (anticlockwise) before mirroring horizontally. The rwp_transform_type[i] field equal to 7 may indicate the transformation applied to the i-th packed region is rotation by 270 degrees (anticlockwise).

The rwp_guard_band_flag[i] field may specify whether the i-th packed region has a guard band. For example, the rwp_guard_band_flag[i] field equal to 0 specifies that the i-th packed region does not have a guard band. the rwp_guard_band_flag[i] field equal to 1 specifies that the i-th packed region has a guard band.

The packed_region_width[i] field, the packed_region_height[i] field, the packed_region_top[i] field, and the packed_region_left[i] field may specify width, height, top luma sample row, and left-most luma sample column, respectively, of the i-th packed region, either within the region-wise packed picture or within each constituent picture of the region-wise packed picture. When constituent_picture_matching_flag is equal to 0, the packed_region_width[i] field, the packed_region_height[i] field, the packed_region_top[i] field, and the packed_region_left[i] field may specify width, height, top luma sample row, and left-most luma sample column, respectively, of the i-th packed region within the region-wise packed picture. When constituent_picture_matching_flag is equal to 1, the packed_region_width[i] field, the packed_region_height[i] field, the packed_region_top[i] field, and the packed_region_left[i] field may specify width, height, top luma sample row, and left-most luma sample column, respectively, of the i-th packed region within each constituent picture of the region-wise packed picture.

The packed_region_width[i] field, the packed_region_height[i] field, the packed_region_top[i] field, and the packed_region_left[i] field may be indicated in relative region-wise packed picture sample units. The packed_region_width[i] field, the packed_region_height[i] field, the packed_region_top[i] field, and the packed_region_left[i] field may represent integer horizontal and vertical coordinates of luma sample units within the cropped decoded pictures.

Referring to Table 1, the multiview region-wise packing information may include a rwp_left_guard_band_width[i] field, a rwp_right_guard_band_width[i] field, a rwp_top_guard_band_height[i] field, a rwp_bottom_guard_band_height[i] field, a rwp_guard_band_not_used_for_pred_flag[i] field, a rwp_guard_band_type[i] field and/or a rwp_guard_band_reserved_zero_3bits[i][j] field.

The rwp_left_guard_band_width[i] field may specify width of a guard band on the left side of the i-th packed region in relative region-wise packed picture sample units. When a chroma_format_idc field is equal to 1 (i.e., chroma format of the region-wise packed picture is 4:2:0 chroma format) or 2 (i.e., chroma format of the region-wise packed picture is 4:2:2 chroma format), the rwp_left_guard_band_width[i] field may correspond to an even number of luma samples within the cropped decoded picture. Meanwhile, height of the guard band on the left side of the i-th packed region may be equal to height of the i-th packed region.

The rwp_right_guard_band_width[i] field may specify width of a guard band on the right side of the i-th packed region in relative region-wise packed picture sample units. When a chroma_format_idc field is equal to 1 (i.e., chroma format of the region-wise packed picture is 4:2:0 chroma format) or 2 (i.e., chroma format of the region-wise packed picture is 4:2:2 chroma format), the rwp_right_guard_band_width[i] field may correspond to an even number of luma samples within the cropped decoded picture. Meanwhile, height of the guard band on the right side of the i-th packed region may be equal to the height of the i-th packed region.

The rwp_top_guard_band_height[i] field may specify height of a guard band above the i-th packed region in relative region-wise packed picture sample units. When a chroma_format_idc field is equal to 1 (i.e., chroma format of the region-wise packed picture is 4:2:0 chroma format), the rwp_topguard_band_height[i] field may correspond to an even number of luma samples within the cropped decoded picture. Meanwhile, width of the guard band on above the i-th packed region may be equal to the width of the i-th packed region.

The rwp_bottom_guard_band_height[i] field may specify height of a guard band below the i-th packed region in relative region-wise packed picture sample units. When a chroma_format_idc field is equal to 1 (i.e., chroma format of the region-wise packed picture is 4:2:0 chroma format), the rwp_bottom_guard_band_height[i] field may correspond to an even number of luma samples within the cropped decoded picture. Meanwhile, width of the guard band on below the i-th packed region may be equal to the width of the i-th packed region.

When the rwp_guard_band_flag[i] field is equal to 1, the rwp_left_guard_band_width[i] field, the rwp_right_guard_band_width[i] field, the rwp_top_guard_band_height[i] field, or the rwp_bottom_guard_band_height[i] field may be greater than 0.

The i-th packed region as specified by this SEI message may not overlap with any other packed region specified by the same SEI message or any guard band specified by the same SEI message.

Also, the guard bands associated with the i-th packed region, if any, as specified by this SEI message may not overlap with any packed region specified by the same SEI message or any other guard bands specified by the same SEI message.

The rwp_guard_band_not_used_for_pred_flag[i] field may specify whether the guard bands for the i-th packed region is used in the inter prediction process. For example, the rwp_guard_band_not_used_for_pred_flag[i] field equal to 0 specifies that the guard bands may or may not be used in the inter prediction process. The rwp_guard_band_not_used_for_pred_flag[i] field equal to 1 specifies that sample values of the guard bands are not used in the inter prediction process.

Specifically, when a value of the rwp_guard_band_not_used_for_pred_flag[i] field is equal to 1, the sample values of guard bands in cropped decoded pictures can be rewritten even if the cropped decoded pictures were used as references for inter prediction of subsequent pictures to be decoded. For example, the content of a packed region can be seamlessly expanded to its guard band with decoded and re-projected samples of another packed region.

The rwp_guard_band_type[i][j] field may indicate a type of the guard bands for the i-th packed region, as follows. Also, the rwp_guard_band_type[i][j] field with j equal to 0, 1, 2, or 3 indicating that the semantics below apply to the left, right, top, or bottom edge, respectively, of the i-th packed region:

For example, the rwp_guard_band_type[i][j] field equal to 0 may indicate that the content of the guard bands in relation to the content of the packed regions is unspecified. When the rwp_guard_band_not_used_for_pred_flag[i] field is equal to 0, the rwp_guard_band_type[i][j] field may not be equal to 0.

The rwp_guard_band_type[i][j] field equal to 1 may indicate that the content of the guard bands suffices for interpolation of sample values at sub-pel sample fractional locations within the packed region and less than one sample outside of the boundary of the packed region. For example, the rwp_guard_band_type[i][j] field equal to 1 can be used when the boundary samples of the i-th packed region have been copied horizontally or vertically to the guard band.

The rwp_guard_band_type[i][j] field equal to 2 may indicate that the content of the guard bands represents actual picture content that is spherically adjacent to the content in the packed region and is on the surface of the packed region at a quality that gradually changes from the picture quality of the packed region to that of the spherically adjacent packed region. In other words, the rwp_guard_band_type[i][j] field equal to 2 may indicate that the content of the guard bands represents actual picture content. Here, the actual picture content may be spherically adjacent to the content in the i-th packed region, and the actual picture content is on the surface of the packed region at a quality that gradually changes from the picture quality of the packed region to that of the spherically adjacent packed region.

The rwp_guard_band_type[i][j] field equal to 3 may indicate that the content of the guard bands represents actual picture content that is spherically adjacent to the content in the packed region and is on the surface of the packed region at a similar picture quality as within the packed region. In other words, the rwp_guard_band_type[i][j] field equal to 3 may indicate that the content of the guard bands represents actual picture content that is spherically adjacent to the content in the i-th packed region and is on the surface of the i-th packed region at a similar picture quality as within the i-th packed region.

Values greater than 3 of the rwp_guard_band_type[i][j] field are reserved for future use by ITU-T|ISO/IEC. Decoders may treat a value of rwp_guard_band_type[i][j] field when the value is greater than 3 as equivalent to the value 0.

The rwp_guard_band_reserved_zero_3bits[i] field may be equal to 0 in bitstreams conforming to this version of this Specification. Other values for the rwp_guard_band_reserved_zero_3bits[i] field may be reserved for future use by ITU-T|ISO/IEC. Decoders may ignore a value of the rwp_guard_band_reserved_zero_3bits[i] field.

Meanwhile, the variables NumPackedRegions, PackedRegionLeft[n], PackedRegionTop[n], PackedRegionWidth[n], PackedRegionHeight[n], ProjRegionLeft[n], ProjRegionTop[n], ProjRegionWidth[n], ProjRegionHeight[n], and TransformType[n] may be derived as follows:

For n in the range of 0 to the num_packed_regions field−1, inclusive, the following applies:

The PackedRegionLeft[n] may set equal to packed_region_left[n]. The PackedRegionTop[n] is set equal to the packed_region_top[n] field. The PackedRegionWidth[n] is set equal to the packed_region_width[n] field. The PackedRegionHeight[n] is set equal to the packed_region_height[n] field. The ProjRegionLeft[n] is set equal to the proj_region_left[n] field. The ProjRegionTop[n] is set equal to the proj_region_top[n] field. The ProjRegionWidth[n] is set equal to the proj_region_width[n] field. The ProjRegionHeight[n] is set equal to the proj_region_height[n] field. The TransformType[n] is set equal to the rwp_transform_type[n] field.

Meanwhile, if the value of the constituent_picture_matching_flag field is equal to 0, the following applies:

The NumPackedRegions is set equal to the num_packed_regions field. Otherwise (the value of the constituent_picture_matching_flag field is equal to 1), the following applies:

The NumPackedRegions is set equal to 2*the num_packed_regions field.

Meanwhile, when TopBottomFlag is equal to 1, the following applies:

projLeftOffset and packedLeftOffset are both set equal to 0. The projTopOffset is set equal to the proj_picture_height field/2 and the packedTopOffset is set equal to the packed_picture_height field/2.

Meanwhile, when SideBySideFlag is equal to 1, the following applies:

The projLeftOffset is set equal to the proj_picture_width field/2 and the packedLeftOffset is set equal to the packed_picture_width field/2. The projTopOffset and the packedTopOffset are both set equal to 0.

Meanwhile, for n in the range of the NumPackedRegions/2 to the NumPackedRegions-1, inclusive, the following applies:

nIdx is set equal to n-the NumPackedRegions/2. The PackedRegionLeft[n] is set equal to the packed_region_left [nIdx] field+the packedLeftOffset. The PackedRegionTop [n] is set equal to the packed_region_top[nIdx] field+the packedTopOffset. The PackedRegionWidth[n] is set equal to the packed_region_width[nIdx] field. The PackedRegionHeight[n] is set equal to the packed_region_height[nIdx] field. The ProjRegionLeft[n] is set equal to the proj_region_left[nIdx]+the projLeftOffset. The ProjRegionTop[n] is set equal to the proj_region_top[nIdx]+the projTopOffset. The ProjRegionWidth[n] is set equal to the proj_region_width [nIdx] field. The ProjRegionHeight[n] is set equal to the proj_region_height[nIdx] field. The TransformType[n] is set equal to the rwp_transform_type[nIdx] field.

Meanwhile, for each value of n in the range of 0 to the NumPackedRegions-1, inclusive, the values of the ProjRegionWidth[n], the ProjRegionHeight[n], the ProjRegionTop [n], and the ProjRegionLeft[n] are constrained as follows:

The ProjRegionWidth[n] may be in the range of 1 to the proj_picture_width field, inclusive. The ProjRegionHeight [n] may be in the range of 1 to the proj_picture_height field, inclusive. The ProjRegionLeft[n] may be in the range of 0 to the proj_picture_width field-1, inclusive. The ProjRegionTop[n] may be in the range of 0 to the proj_picture_height field-1, inclusive.

If the ProjRegionTop[n] is less than the proj_picture_ height field/VerDiv1, the sum of the ProjRegionTop[n] and the ProjRegionHeight[n] may be less than or equal to the proj_picture_height field/VerDiv1. Otherwise, the sum of the ProjRegionTop[n] and the ProjRegionHeight[n] may be less than or equal to the proj_picture_height field/VerDiv1*2.

For each value of n in the range of 0 to the NumPackedRegions-1, inclusive, the values of the PackedRegionWidth[n], the PackedRegionHeight[n], the PackedRegionTop[n], and the PackedRegionLeft[n] are constrained as follows:

The PackedRegionWidth[n] may be in the range of 1 to the packed_picture_width field, inclusive. The ProjRegionHeight[n] may be in the range of 1 to the packed_picture_ height field, inclusive. The PackedRegionLeft[n] may be in the range of 0 to the packed_picture_width field-1, inclusive. The PackedRegionTop[n] may be in the range of 0 to the packed_picture_height field-1, inclusive.

If the PackedRegionLeft[n] is less than the packed_picture_width field/HorDiv1, the sum of the PackedRegionLeft [n] and the PackedRegionWidth[n] may be less than or equal to the packed_picture_width field/HorDiv1. Otherwise, the sum of the PackedRegionLeft[n] and the PackedRegionWidth[n] may be less than or equal to the packed_picture_width field/HorDiv1*2.

If the PackedRegionTop[n] is less than the packed_picture_height field/VerDiv1, the sum of the PackedRegionTop [n] and the PackedRegionHeight[n] may be less than or equal to the packed_picture_height field/VerDiv1. Otherwise, the sum of the PackedRegionTop[n] and the PackedRegionHeight[n] may be less than or equal to the packed_picture_height field/VerDiv1*2.

Meanwhile, when the chroma_format_idc is equal to 1 (4:2:0 chroma format) or 2 (4:2:2 chroma format), the PackedRegionLeft[n] may correspond to an even horizontal coordinate value of luma sample units, and the PackedRegionWidth[n] may correspond to an even number of luma samples, both within the decoded picture. Also, when the chroma_format_idc is equal to 1 (4:2:0 chroma format), the PackedRegionTop[n] may correspond to an even vertical coordinate value of luma sample units, and the ProjRegionHeight[n] may correspond to an even number of luma samples, both within the decoded picture.

FIG. 10 illustrates overall architecture for providing a 3DoF content/3DoF+ content in which the multiview region-wise packing information are used.

Referring to FIG. 10, end-to-end flow chart of multi-view 3DoF+ video is described which is composed by multi-view region-wise packing and unpacking, including selection.

Specifically, a real-world audio-visual scene (A) may be captured by audio sensors as well as a set of cameras or a camera device with multiple lenses and sensors. The acquisition may result in a set of digital image/video (Bi) and audio (Ba) signals. The cameras/lenses typically may cover all directions around the centre point of the camera set or camera device, thus the name of 360-degree video.

The images (Bi) captured by texture/depth camera lenses at the same time instance and/or different head position and/or different viewpoint may be stitched, possibly rotated, projected per view and/or viewpoint, and then mapped onto a packed picture (D).

Specifically, the packed pictures (D) may be encoded as coded images (Ei) or a coded video bitstream (Ev). The captured audio (Ba) may be encoded as an audio bitstream (Ea). The coded images, video, and/or audio may be then composed into a media file for file playback (F) or a sequence of an initialization segment and media segments for streaming (Fs), according to a particular media container file format. The media container file format might be the ISO Base Media File Format. The file encapsulator also may include metadata into the file or the segments, such as multi-view region-wise packing information assisting in rendering the decoded packed pictures.

For example. the metadata in the file includes:
metadata on location and rotation of a local sphere coordinate representing a view,
metadata on location and rotation difference of a local sphere of a view from an anchor view for the view,
metadata on projection format of the projected picture of a view,
metadata on coverage of the projected picture of a view,
metadata on multi-view region-wise packing information, and
metadata on region-wise quality ranking.

The segments Fs may be delivered using a delivery mechanism to a player.

The file that the file encapsulator outputs (F) maybe or maybe not identical to the file that the file decapsulator inputs (F'). A file decapsulator may process the file (F') or the received segments (F's) and extract the coded bitstreams (E'a, E'v, and/or E'i) and parse the metadata. The audio, video, and/or images may be then decoded into decoded signals (B'a for audio, and D' for images/video). The decoded packed pictures (D') may be projected onto the screen of a head-mounted display or any other display device based on the current viewing orientation or viewport and/or view (e.g., head position) and/or viewpoint and projection, spherical coverage, rotation, and multi-view region-wise packing metadata parsed from the file. Likewise, decoded audio (B'a) may be rendered, e.g. through headphones, according to the current viewing orientation. The current viewing orientation may be determined by the head tracking and possibly also eye tracking functionality. Besides being used by the renderer to render the appropriate part of decoded video and audio signals, the current viewing orientation may also be used by the video and audio decoders for decoding optimization.

Meanwhile, for example, the syntax of the multiview region-wise packing may be defined in the file format domain, such as ISOBMFF, OMAF. In other words, the multiview region-wise packing information may be included in a form of a box in the file format domain, such as ISOBMFF, OMAF.

According to an embodiment, MultiviewRegionWisePackingBox may be defined as shown in the following table.

TABLE 2

| Box Type: | 'mrwp' |
|---|---|
| Container: | ProjectedOmniVideoBox |
| Mandatory: | No |
| Quantity: | Zero or one |

The MultiviewRegionWisePackingBox may specify information of the mapping between packed regions and the corresponding projected regions of a component of a view (e.g., eye view, viewing position or viewpoint) and information of location and size of the guard bands, if any.

For example, The MultiviewRegionWisePackingBox may include the multiview region-wise packing information of the current image/video as shown in the following table.

TABLE 3

```
{
aligned(8) class MultiviewRegionWisePackingBox extends FullBox
('mrwp', 0, 0)
    MultiviewRegionWisePackingStruct( );
}
aligned(8) class MultiviewRegionWisePackingStruct 0 {
    unsigned int(1) constituent_picture_matching_flag;
    unsigned int(1) packing_format_matching_between_views_flag;
    bit(6) reserved = 0;
    unsigned int(8) num_view_minus1;
    for( i = 0; i < = num_view_minus1; i++) {
        unsigned int (8) mrwp_view_id;
        unsigned int (1) mrwp anchor_view_flag;
        unsigned int (1) mrwp_view_independent_rotation_flag;
        unsigned int (1) mrwp component independent rotation flag;
        unsigned int (1) mrwp_all_components_packed_in_one_region_flag;
        bit(4) mrwp_reserved_zero_Sbits
        if( mrwp_anchor_view_flag ) {
            signed int (32) mrwp_location_anchor_view_x;
            signed int (32) mrwp_location_anchor_view_y;
            signed int (32) mrwp_location_anchor_view_z;
            signed int (32) mrwp_rotation_anchor_view_yaw;
            signed int (32) mrwp_rotation_anchor_view_pitch;
            signed int (32) mrwp_rotation_anchor_view_roll;
        }
```

TABLE 3-continued

```
        else {
            signed int (32) mrwp_location_diff_x;
            signed int (32) mrwp_location_diff_y;
            signed int (32) mrwp_location_diff_z;
            if( mrwp_view_independent_rotation_flag ) {
                signed int (32) mrwp_rotation_diff_yaw;
                signed int (32) mrwp_rotation_diff_pitch;
                signed int (32) mrwp_rotation_diff_roll;
            }
        }
        unsigned int (8) num_component_minus1;
        for( j = 0; j < = num_component_minust j++) {
            unsigned int (8) mrwp_component_id;
            unsigned int (4) mrwp_component_type;
            unsigned int (4) mrwp_projection_type;
            unsigned int (32) mrwp_proj_picture_width;
            unsigned int (32) mrwp_proj_picture_height;
            unsigned int (32) mrwp_coverage_horizontal;
            unsigned int (32) mrwp_coverage_vertical;
            if( mrwp_component_type == 2) {
                unsigned int (32) depth_near;
                unsigned int (32) depth_far;
            }
            if( mrwp_component_dependent_rotation_flag )
                signed int (32) mrwp_rotation_component_diff_yaw;
                signed int (32) mrwp_rotation_component_diff_pitch;
                signed int (32) mrwp_rotation_component_diff_roll;
        }
        if( mrwp_all_components_packed_in_one_region_flag ) (
            unsigned int (32) mrwp_packed_region_width;
            unsigned int (32) mrwp_packed_region_height;
            unsigned int (32) mrwp_packed_region_top;
            unsigned int (32) mrwp_packed_region_left;
        }
    }
    unsigned int(8) num_regions;
    unsigned int(16) packed_picture_width;
    unsigned int(16) packed_picture_height;
    for( i = 0; i < num_packed_regions;i++) (
        unsigned int (8) num_view_id_minus1;
        for( j = 0; j < num_view_id_minus1;j++) {
            unsigned int (8) view_idx;
            unsigned int (8) num_component_id_minus1
            for( k = 0; k < = num_component_id_minus1; k++) (
                unsigned int (8) component_idx;
                unsigned int (32) proj_region_width;
                unsigned int (32) proj_region_height;
                unsigned int (32) proj_region_top;
                unsigned int (32) proj_region_left;
            }
        }
        bit(3) reserved = 0;
        unsigned int(1) guard_band_flag NI;
        unsigned int(4) packing_type[i];
        if (packing_type[i] = = 0) {
            unsigned int (32) packed_region_width;
            unsigned int (32) packed_region_height;
            unsigned int (32) packed_region_top;
            unsigned int (32) packed_region_left;
            RectRegionPacking(i);
            if (guard_band_flag[i])
                GuardBand(i);
        }
    }
}
```

The meanings of syntaxs in the MultiviewRegionWisePackingBox is identical to meanings of the syntax in the multiview region-wise packing SEI message described above.

Meanwhile, when a broadcast service for 3DoF+ contents is provided through the DASH based adaptive streaming model or a video of the 3DoF+ contents is streamed through the DASH based adaptive streaming model, the above-described fields related metadata (i.e. the multiview region-wise packing information) can be signaled in a DASH based descriptor format included in a DASH MPD. That is, the above-described embodiments can be modified in the DASH based descriptor format. The DASH based descriptor format can include an EssentialProperty descriptor and a SupplementalProperty descriptor. A descriptor representing the aforementioned fields of 360 video related metadata can be included in AdaptationSet, Representation or SubRepresentation of the MPD.

For example, a DASH based descriptor can include an @schemeIdUri field, an @value field and/or an @id field.

The @schemeIdUri field can provide a URI for identifying the scheme or the corresponding descriptor. The @value field can have values defined by the scheme indicated by the @schemeIdUri field. That is, the @value field can have values of descriptor elements according to the corresponding scheme, which can be called parameters. These can be discriminated by ','. The @id field can indicate the ID of the corresponding descriptor. When descriptors have the same ID, the descriptors can include the same scheme ID, values and parameters.

FIG. 11 illustrates an example of a pre-encoding process of multiview region-wise packing with texture, residual, and depth map of multi-views.

Referring to FIG. 11, an example of the pre-encoding processing of the multi-view region-wise packing is described which is based on the region-wise packing of each view and component. In FIG. 11, the viewpoint may be assumed to be unchanged so the multiple inputs to the multi-view region-wise packing originate from different views and different components. As shown in FIG. 11, each view could be composed by different components, e.g., texture and depth map, which are produced into a projected picture of each component of each view by stitching, rotation, projection, and frame (i.e., picture) packing process. In addition, using redundancy between views, for example between anchor view and the right head motion view, the residual of texture, also depth or other components if possible, could be generated for subsidiary views. This could increase bit efficiency by eliminating redundant information between views. Ones the projected pictures of each view including texture, residual, and depth, they may be packed into a single 2D image plane (e.g., a packed picture) and then the video may be encoded using single layer video encoder, such as HEVC or VVC.

FIG. 12 illustrates an example of post-decoder process of the multiview region-wise packing. Referring to FIG. 12, an example of the post-decoder process of the multiview region-wise packing is described. Specifically, after decoding for at least one encoded picture (i.e., a packed picture), a post decoder processor of a 360 video reception apparatus could generate multiple projected pictures per view for each viewpoint. However, since not all the images are played on the display device, target projected pictures could be generated based on the viewer's viewpoint and viewing position. Here, the viewer may be called a user. In FIG. 12, a view B of viewpoint A is assumed to be selected and related projected pictures, such as texture, residual, and depth map, could be inputs to the renderer before display. In other words, only the projected pictures to which the components (e.g., texture, residual, depth map) for the selected view B are mapped can be input to the renderer before display.

FIG. 13 illustrates an example of decoding process of multi-view region-wise packing with texture, residual, and depth map for a view B of a viewpoint A.

Referring to FIG. 13, the detailed flow chart of the decoder and the post-decoder process is described. In FIG. 13, HEVC single layer decoder is assumed as the decoder. Referring to FIG. 13, after decoded picture is generated by the HEVC decoder, packed regions corresponding to a target view and viewpoint (e.g., the view B of the viewpoint A) are selected and projected pictures of each component, such as texture, residual, and depth map, are produced. If the generated projected pictures contain residual picture, corresponding texture picture for the residual picture (e.g., texture of an anchor view) may be generated and the 360 video reception apparatus may perform texture composition step based on the residual picture and the corresponding texture picture. After deriving a projected picture of texture of the target view, and also that of depth, each of projected pictures is mapped onto a sphere coordinate and align the rotation of each sphere if needed. If the target view is not exactly match with the pictured provided in the decoded picture, views could be synthesized by using texture and depth map of adjacent existing view or views.

Specifically, for example, in each step, the above-described syntax elements can be used as follows.

—View Selection

The 360 video reception apparatus may find a view that matches with the target view and viewpoint, i.e. view B of viewpoint A in FIGS. 3 and 4, with the viewpoint location given by the mrwp_location_anchor_view_x[i] field, the mrwp_location_anchor_view_y[i] field, and the mrwp_location_anchor_view_z[i] field and the viewing position given by the mrwp_location_anchor_view_x[i] field, the mrwp_location_anchor_view_y[i] field, and the mrwp_location_anchor_view_z[i] field for anchor view or (x,y,z) location calculated by the mrwp_location_anchor_view_x[i] field+the mrwp_location_diff_x[i] field, the mrwp_location_anchor_view_y[i] field+the mrwp_location_diff_y[i] field, and the mrwp_location_anchor_view_z[i] field+the mrwp_location_diff_z[i] field for subsidiary views. In other words, the 360 video reception apparatus may find a view that matches with the target view, based on a location of a view given by the mrwp_location_anchor_view_x[i] field, the mrwp_location_anchor_view_y[i] field, and the mrwp_location_anchor_view_z[i] field, or a location of a view calculated by the mrwp_location_anchor_view_x[i] field+the mrwp_location_diff_x[i] field, the mrwp_location_anchor_view_y[i] field+the mrwp_location_diff_y[i] field, and the mrwp_location_anchor_view_z[i] field+the mrwp_location_diff_z[i] field for subsidiary views. Here, the view may represent the viewing position or the viewpoint.

Also, the location of viewing position or viewpoint could be signaled by alternative ways, such as orientation given by an azimuth angle, an elevation angle, and a tilt angle, in the super sphere that contains all of the viewpoints as well as viewing positions, and the distance from the origin of the super sphere. When the viewpoint and the viewing position is matched with the target viewpoint and the target viewing position, the i-th view indicator mrwp_view_id[i] field is used in the following region selection process.

—Region Selection

The 360 video reception apparatus may find packed regions with view index view_idx[i][j] field that matches with the target view indicated by the mrwp_view_id[i] field. In addition, if not all the components corresponding to the i-th view (e.g., a viewing position) indicated by the mrwp_view_id[i] field are used, those components could be discarded by using the mrwp_component_type[i][j] field.

Also, in the generation of the projected picture of the target view, the mrwp_proj_picture_width[i][j] field and the mrwp_proj_picture_height[i][j] field may be used to indicate a size of the projected picture of the component type mrwp_component_type[i][j] field indicated by the mrwp_component_id[i][j] field.

Once the picture size is determined, regions may be selected from the packed picture at the position indicated by the packed_region_top[i] field, packed_region_left[i] field with the region size indicated by the packed_region_width[i] field, the packed_region_height[i] field. In other words, region indicated by the packed_region_top[i] field, packed_region_left[i] field, the packed_region_width[i] field and the packed_region_height[i] field in the packed picture may be selected.

With the component index indicated by the component_idx[i][j][k] field corresponding to the selected region, it may be mapped onto the projected picture of component type indicated by the mrwp_component_type[i][j] field. The component type indicated by the mrwp_component_type[i][j] field is corresponding to the mrwp_component_id[i][j] field which corresponding to the component_idx[i][j][k] field. The regions selection and mapping onto the projected picture may be performed for all numbers of packed regions signaled by the num_packed_regions field and the output may be the projected picture of selected components of the selected view and viewpoint.

—Texture Composition

If the components of the selected view contain residuals, the projected picture of the texture of the selected view may be generated by composing the residual of the selected view and the reference picture, e.g., the projected picture of the texture of the anchor view. For this step, decoders might need to generate pictures from multiple views. The detailed process might comprise motion estimation, compensation between views with the appropriate motion information. Other components, e.g., depth map, could be delivered by the residuals.

—Sphere Coordinate Conversion

To align components within a selected view or between views, the rotation of each view indicated by the mrwp_rotation_anchor_view_yaw[i] field, the mrwp_rotation_anchor_view_pitch[i] field, the mrwp_rotation_anchor_view_roll[i] field or the mrwp_rotation_diff_yaw[i] field, the mrwp_rotation_diff_pitch[i] field, the mrwp_rotation_diff_roll[i] field could be used to align with the global coordinate.

—View Synthesis

If the selected view is not match with the target view, a view could be synthesized by using texture and depth of adjacent views. Here, the adjacent views may be views that are adjacent to the location of the target view. Also, the detailed process may comprise a depth change estimation process between views, and depth information such as the depth_near[i][j] field and the depth_far[i][j] field could be used to estimate the depth changes between views.

FIGS. 14a and 14b illustrate examples of the multiview region-wise packing process for a video including multiple views. FIG. 14a illustrates an example of the multiview region-wise packing process for a packed picture of multiple viewing positions. FIG. 14b illustrates an example of the multiview region-wise packing process for a packed picture of eye-views.

Referring to FIGS. 14a and 14b, a size of the packed picture could be efficiently reduced by sharing regions between viewing positions or between eye-views, etc. In FIG. 14a, two different use cases of sharing regions between viewing positions are shown. Specifically, if there is high correlation between regions, one region from one view could be used a substitution of the other as shown in (a) of FIG. 14a. Also, one region from one view could be used a base picture with the aid of additional residuals as shown in (b) of FIG. 14a. In this process, the shared region could be one of the regions between views or average of them.

Similarly, regions could be shared between projected pictures of left and right eye-views. In FIG. 14b, two different use cases of sharing regions between eye-views are shown.

For example, one region from one eye-view could be used a substitution of the other as shown in (a) of FIG. 14b. Also, one region from one eye-view could be used a base picture with the aid of additional residuals as shown in (b) of FIG. 14b.

FIG. 15 schematically illustrates a 360 video data processing method performed by a 360 video transmission apparatus according to the present invention. The method illustrated in FIG. 15 may be performed by the 360 video transmission apparatus illustrated in FIG. 8. Specifically, S1500 in FIG. 15 can be performed by the data input unit of the 360 video transmission apparatus, S1510 can be performed by the projection processor of the 360 video transmission apparatus, S1520 can be performed by the packing processor of the 360 video transmission apparatus, S1530 can be performed by the data encoder of the 360 video transmission apparatus, S1540 can be performed by the metadata encoder of the 360 video transmission apparatus, and S1550 can be performed by the transmission processor of the 360 video transmission apparatus.

The 360 video transmission apparatus acquires 360-degree video for a plurality of views (S1500). The 360 video transmission apparatus may acquire 360 video of the views captured by at least one camera. Here, the views may represent eye-views, viewing positions or viewpoints.

The 360 video transmission apparatus generates projected pictures for the views by processing the 360-degree video (S1510). The 360 video transmission apparatus may perform projection according to a projection scheme for 360 video data of each view among various projection schemes. Also, the 360 video transmission apparatus may determine whether the 360 video data of the each view is stitched. For example, the 360 video transmission apparatus may determine that the 360 video data of the each view is not stitched when the projection scheme corresponds to a specific scheme, that is, projection scheme information about the 360 video data indicates the specific scheme. Further, the various projection schemes may include the equirectangular projection scheme, the cubic projection scheme, the cylindrical projection scheme, the tile-based projection scheme, the pyramid projection scheme, the panoramic projection scheme and the specific scheme of directly projecting video data on a 2D image without stitching.

Further, when the 360 video data of the each view, the 360 video transmission apparatus may stitch the 360 video data of the each view and project the stitched 360 video data on the 2D based picture of the each view. When the 360 video data of the each view is not stitched, the 360 video transmission apparatus may project the 360 video data on the 2D based picture of the each view without stitching. Here, the 2D based picture may be called a 2D image or a projected picture of the each view. Also, the 360 video transmission apparatus may project respectively project components of the each view, a projected picture of each of the components may be derived. For example, the components may include texture, depth, and/or residual.

The 360 video transmission apparatus generates a packed picture by packing the projected pictures (S1520). The 360 video transmission apparatus may perform a region-wise packing process for the projected picture. According to the region-wise packing process, projected pictures of the views are packed into a 2D image plane. Here, the 2D image plane may be called the packed picture. For example, a projected region in the projected picture may be mapped onto a packed region in the packed picture. Also, transformation is applied to the projected region in the projected picture, and the projected region is mapped onto the packed region in the packed picture. The 360 video transmission apparatus may generate information indicating a type of the transformation. Also, The 360 video transmission apparatus may generate a guard band of the packed region. The multiview region-wise packing information may include information about the guard band of the packed region.

The 360 video transmission apparatus encodes the packed picture (S1530). The 360 video transmission apparatus can encode the packed picture.

The 360 video transmission apparatus generates metadata about the 360-degree video (S1540). The 360 video transmission apparatus may generate the metadata about the multiview region-wise packing.

For example, the metadata may include multiview region-wise packing information. Here, the metadata may be referred to as signaling information.

The multiview region-wise packing information may include a multiview_regionwise_packing_id field, a multiview_regionwise_packing_cancel_flag field, a multiview_regionwise_packing_persistence_flag field, a constituent_picture_matching_flag field, a packing_format_matching_between_views_flag field, a num_view_minus1 field, a mrwp_view_id[i] field, a mrwp_anchor_view_flag[i] field, a mrwp_view_independent_rotation_flag[i] field, a mrwp_all_components_in_one_packedregion_flag[i] field, a mrwp_reserved_zero_4bits[i] field, a mrwp_location_anchor_view_x[i] field, a mrwp_location_anchor_view_y[i] field, a mrwp_location_anchor_view_z[i] field, a mrwp_rotation_anchor_view_yaw[i] field, a mrwp_rotation_anchor_view_pitch[i] field, a mrwp_rotation_anchor_view_roll[i] field, a mrwp_location_diff_x[i] field, a mrwp_location_diff_y[i] field, a mrwp_location_diff_z[i] field, a mrwp_rotation_diff_yaw[i] field, a mrwp_rotation_diff_pitch[i] field, a mrwp_rotation_diff_roll [i] field, a num_component_minus1[i] field, a mrwp_component_id[i][j] field, a mrwp_component_type[i][j] field, a mrwp_projection_type[i][j] field, a mrwp_proj_picture_width[i][j] field, a mrwp_proj_picture_height[i][j] field, a mrwp_coverage_horizontal[i][j] field, a mrwp_coverage_vertical[i][j] field, a depth_near[i][j] field, a depth_far[i][j] field, a mrwp_rotation_component_diff_yaw[i][j] field, a mrwp_rotation_component_diff_pitch[i][j] field, a mrwp_rotation_component_diff_roll[i][j] field, a mrwp_packed_region_width[i][j] field, a mrwp_packed_region_height[i][j] field, a mrwp_packed_region_top[i][j] field, a mrwp_packed_region_left[i][j] field, a num_packed_regions field, a packed_picture_width field, a packed_picture_height field, a num_view_id_minus1[i] field, a view_idx[i][j] field, a num_component_id_minus1[i][j] field, a component_idx[i][j][k] field, a proj_region_width[i][j][k] field, a proj_region_height[i][j][k] field, a proj_region_top[i][j][k] field, a proj_region_left[i][j][k] field, a rwp_reserved_zero_4bits[i] field, a rwp_transform_type[i] field, a rwp_guard_band_flag[i] field, a packed_region_width[i] field, a packed_region_height[i] field, a packed_region_top[i] field, a packed_region_left[i] field, a rwp_left_guard_band_width[i] field, a rwp_right_guard_band_width[i] field, a rwp_top_guard_band_height[i] field, a rwp_bottom_guard_band_height[i] field, a rwp_guard_band_not_used_for_pred_flag[i] field, a rwp_guard_band_type[i] field and/or a rwp_guard_band_reserved_zero_3bits[i][j] field. The meanings of fields of the multiview region-wise packing information is identical to meanings described above.

Specifically, the multiview region-wise packing information may include information about each of the views.

For example, the multiview region-wise packing information may include information about a view.

According to an embodiment, the information about the view may include a view index of the view indicating an identifying number of the view. The view index of the view may represent the mrwp_view_id[i] field.

Also, the information about the view may include information indicating a number of components for the view. The information about the view may include information about each component of a projected picture for the view. The information indicating the number of components for the view may represent the num_component_minus1[i] field.

For example, information about the component of the projected picture may include a component index of the view indicating an identifying number of the component, and information indicating a type of the component. Also, the information about the component of the projected picture may include information indicating a projection type of the projected picture. The component index of the view may represent the mrwp_component_id[i][j] field, and the information indicating the type of the component may represent the mrwp_component_type[i][j] field. The information indicating a projection type of the projected picture may represent the mrwp_projection_type[i][j] field. The projection type is one of the equirectangular projection and the cube map projection.

Also, the information about the component of the projected picture may include information indicating width and height of the projected picture, and information indicating horizontal coverage and vertical coverage of the component. The information indicating the width and the height of the projected picture may represent the mrwp_proj_picture_width[i][j] field and the mrwp_proj_picture_height[i][j] field, respectively.

Also, the information about the view may include an anchor view flag indicating whether the view is an anchor view. When the anchor view flag indicates the view is the anchor view, the information about the view may include information indicating an x component, a y component and a z component of a location of the anchor view. The anchor view flag may represent the mrwp_anchor_view_flag[i] field. The information indicating the x component, the y component and the z component of the location of the anchor view may represent the mrwp_location_anchor_view_x[i] field, the mrwp_location_anchor_view_y[i] field, the mrwp_location_anchor_view_z[i] field, respectively.

Also, when the anchor view flag indicates the view is the anchor view, the information about the view may include information indicating a yaw angle, a pitch angle and a roll angle of a rotation of the anchor view. The information indicating the yaw angle, the pitch angle and the roll angle of the rotation of the anchor view may represent the mrwp_rotation_anchor_view_yaw[i] field, the mrwp_rotation_anchor_view_pitch[i] field, the mrwp_rotation_anchor_view_roll[i] field, respectively.

Also, when the anchor view flag indicates the view is not the anchor view, the information about the view may include information indicating an x component, a y component and a z component of a location of the view, and information indicating a yaw angle, a pitch angle and a roll angle of a rotation of the view. The information indicating the x component, the y component and the z component of the location of the view may represent the mrwp_location_diff_x[i] field, the mrwp_location_diff_y[i] field, the mrwp_location_diff_z[i] field, respectively. The information indicating the yaw angle, the pitch angle and the roll angle of the rotation of the view may represent the mrwp_rotation_diff_yaw[i] field, the mrwp_rotation_diff_pitch[i] field, the mrwp_rotation_diff_roll[i] field, respectively.

Also, the information about the view may include a flag indicating whether one packed region consist all component of the projected picture of the view. When a value of the flag is 1, the information about the view may include information indicating a top-left sample position of the packed region in the packed picture, and information indicating width and height of the packed region in the packed picture. The information indicating the top-left sample position of the packed region in the packed picture may represent the mrwp_packed_region_top field and the mrwp_packed_region_left field, respectively. The information indicating the width and the height of the packed region in the packed picture may represent the mrwp_packed_region_width[i][j] field and the mrwp_packed_region_height[i][j] field, respectively.

Also, for example, the multiview region-wise packing information may include information about a packed region in the packed picture. The packed picture may include a plurality of packed regions, the multiview region-wise packing information may include information about each of the packed regions in the packed picture. The multiview region-wise packing information may include information indicating a number of packed regions in the packed picture. The information indicating the number of the packed regions in the packed picture may represent the num_packed_regions field.

Specifically, the information about the packed region may include a view index for the packed region indicating an identifying number of a view for the packed region and component index indicating an identifying number of a component of the view for the packed region. The view index for the packed region may represent the view_idx[i][j] field, and the component index indicating an identifying number of a component of the view for the packed region may represent the component_idx[i][j][k] field. The multiview region-wise packing information may include information about plurality of components of the view for the packed region. The information about the packed region may include information indicating a number of components of the view for the packed region. The information indicating a number of components of the view for the packed region may represent the num_component_id_minus1[i][j] field.

Also, the information about the packed region may include information indicating a top-left sample position of a projected region in the projected picture of the view, and information indicating width and height of the projected region in the projected picture of the view. In deriving process of the projected picture of the view, the packed region may be mapped onto the projected region in the projected picture. The information indicating the top-left sample position of the projected region in the projected picture of the view may represent the proj_region_top[i][j][k] field and the proj_region_left[i][j][k] field, respectively. The information indicating the width and the height of the projected region in the projected picture of the view may represent the proj_region_width[i][j][k] field and the proj_region_height[i][j][k] field, respectively.

Also, the information about the packed region may include information indicating a top-left sample position of the packed region in the packed picture, and information indicating width and height of the packed region in the packed picture. The information indicating the top-left sample position of the packed region in the packed picture may represent the packed_region_top[i] field and the packed_region_left[i] field, respectively. The information indicating the width and the height of the packed region in the packed picture may represent the packed_region_width[i] field and the packed_region_height[i] field, respectively.

Also, for example, the information about the packed region may include a guard band flag indicating whether a guard band of the packed region is present. The guard band flag may represent the rwp_guard_band_flag[i] field.

Also, when the guard band flag indicates the guard band of the packed region is present, the information about the packed region may include information indicating width of a left guard band of the packed region, information indicating width of a right guard band of the packed region, information indicating height of an upper guard band of the packed region, and information indicating height of a lower guard band of the packed region. The information indicating the width of the left guard band of the packed region, the information indicating the width of the right guard band of the packed region, the information indicating the height of the upper guard band of the packed region, and the information indicating the height of the lower guard band of the packed region may represent the rwp_left_guard_band_width[i] field, the rwp_right_guard_band_width[i] field, the rwp_top_guard_band_width[i] field, the rwp_bottom_guard_band_width[i] field, respectively.

The 360 video transmission apparatus performs processing for storage or transmission of the encoded picture and the metadata (S1550). The 360 video transmission apparatus may encapsulate the encoded picture for the 360-degree video and/or the metadata into a file. The 360 video transmission apparatus can encapsulate the encoded picture for the 360-degree video and/or the metadata in a file format such as ISOBMFF and CFF or process the encoded picture for the 360-degree video and/or the metadata into a form such as DASH segments in order to store or transmit the encoded 360 video data and/or the metadata. For example, the metadata may be included in boxes at various levels in ISOBMFF or included as data in a separate track in a file. Further, the 360 video transmission apparatus may encapsulate the metadata in a file. The 360 video transmission apparatus may perform processing for transmission on the encapsulated 360 video data according to file format. The 360 video transmission apparatus may process the 360 video data according to an arbitrary transmission protocol. The processing for transmission may include processing for delivery through a broadcast network or processing for delivery through a communication network such as a broad band. In addition, the 360 video transmission apparatus may perform processing for transmission on the metadata. The 360 video transmission apparatus may transmit the processed 360 video data and metadata through a broadcast network and/or a broad band.

FIG. 16 schematically illustrates a 360 video transmission apparatus for performing a 360 video data processing method according to the present invention. The method illustrated in FIG. 15 may be performed by the 360 video transmission apparatus illustrated in FIG. 16. Specifically, the data input unit of the 360 video transmission apparatus in FIG. 16 can perform S1500 in FIG. 15, the projection processor of the 360 video transmission apparatus in FIG. 16 can perform S1510 in FIG. 15, the packing processor of the 360 video transmission apparatus in FIG. 16 can perform S1520 in FIG. 15, the data encoder of the 360 video transmission apparatus in FIG. 16 can perform S1530 in FIG. 15, the metadata encoder of the 360 video transmission apparatus in FIG. 16 can perform S1540 in FIG. 15, and the transmission processor of the 360 video transmission apparatus in FIG. 16 can perform S1550 in FIG. 15.

According to the present invention, it is possible to propose a method for providing interactive experience in 3DoF+ content consumption of users by supporting head motion parallax.

Also, according to the present invention, a packed picture containing components for a plurality of views may be generated by the multiview region-wise packing. Accordingly, bit efficiency of the 3DoF+ content may be increased by eliminating redundant information between views.

FIG. 17 schematically illustrates a 360 video data processing method performed by a 360 video reception apparatus according to the present invention. The method illustrated in FIG. 17 may be performed by the 360 video reception apparatus illustrated in FIG. 9. Specifically, S1700 in FIG. 17 can be performed by the data input unit of the 360 video reception apparatus, S1710 can be performed by the reception processor/the file extraction unit of the 360 video reception apparatus, S1720 can be performed by the data decoder of the 360 video reception apparatus, S1730 and S1740 can be performed by the unpacking processor of the 360 video reception apparatus, and S1750 can be performed by the renderer of the 360 video reception apparatus.

The 360 video reception apparatus receives 360-degree video data for a plurality of views (S1700). The 360 video reception apparatus can the 360-degree video data for the views. Here, the views may represent eye-views, viewing positions, or viewpoints. The 360-degree video data may include a video stream for each view. A video stream for a view may include metadata and information on an encoded packed picture. The views may include at least one view set, and view set may include an anchor view.

The 360 video reception apparatus can receive the 360-degree video data signaled from a 360 video transmission apparatus through a broadcast network. In addition, the 360 video reception apparatus may receive the 360-degree video data through a communication network such as a broad band or a storage medium.

The 360 video reception apparatus derives metadata and information on a packed picture (S1710). The 360 video reception apparatus can perform processing according to a transmission protocol on the received information on the packed picture and the metadata. Further, the 360 video reception apparatus can perform processing reverse to processing for transmission of the 360 video transmission apparatus.

Here, the metadata about the 360-degree video data may be referred to as signaling information. Meanwhile, the metadata can be transmitted through an SEI message. Further, the metadata may be included in AdaptationSet, Representation or SubRepresentation of an MPD (Media Presentation Description).

For example, the metadata may include multiview region-wise packing information.

The multiview region-wise packing information may include a multiview_regionwise_packing_id field, a multiview_regionwise_packing_cancel_flag field, a multiview_regionwise_packing_persistence_flag field, a constituent_picture_matching_flag field, a packing_format_matching_between_views_flag field, a num_view_minus1 field, a mrwp_view_id[i] field, a mrwp_anchor_view_flag[i] field, a mrwp_view_independent_rotation_flag[i] field, a mrwp_all_components_in_one_packedregion_flag[i] field, a mrwp_reserved_zero_4bits[i] field, a mrwp_location_anchor_view_x[i] field, a mrwp_location_anchor_view_y[i] field, a mrwp_location_anchor_view_z[i] field, a mrwp_rotation_anchor_view_yaw[i] field, a mrwp_rotation_anchor_view_pitch[i] field, a mrwp_rotation_anchor_view_roll[i] field, a mrwp_location_diff_x[i] field, a mrwp_location_diff_y[i] field, a mrwp_location_diff_z[i] field, a mrwp_rotation_diff_yaw[i] field, a mrwp_rotation_diff_pitch[i] field, a mrwp_rotation_diff_roll [i] field, a num_component_minus1[i] field, a mrwp_component_id[i][j] field, a mrwp_component_type[i][j] field, a mrwp_projection_type[i][j] field, a mrwp_proj_picture_width[i][j] field, a mrwp_proj_picture_height[i][j] field, a mrwp_coverage_horizontal[i][j] field, a mrwp_coverage_vertical[i][j] field, a depth_near[i][j] field, a depth_far[i][j] field, a mrwp_rotation_component_diff_yaw[i][j] field, a mrwp_rotation_component_diff_pitch[i][j] field, a mrwp_rotation_component_diff_roll[i][j] field, a mrwp_packed_region_width[i][j] field, a mrwp_packed_region_height[i][j] field, a mrwp_packed_region_top[i][j] field, a mrwp_packed_region_left[i][j] field, a num_packed_regions field, a packed_picture_width field, a packed_picture_height field, a num_view_id_minus1[i] field, a view_idx[i][j] field, a num_component_id_minus1[i][j] field, a component_idx[i][j][k] field, a proj_region_width[i][j][k] field, a proj_region_height[i][j][k] field, a proj_region_top[i][j][k] field, a proj_region_left[i][j][k] field, a rwp_reserved_zero_4bits[i] field, a rwp_transform_type[i] field, a rwp_guard_band_flag[i] field, a packed_region_width[i] field, a packed_region_height[i] field, a packed_region_top[i] field, a packed_region_left[i] field, a rwp_left_guard_band_width[i] field, a rwp_right_guard_band_width[i] field, a rwp_top_guard_band_height[i] field, a rwp_bottom_guard_band_height[i] field, a rwp_guard_band_not_used_for_pred_flag[i] field, a rwp_guard_band_type[i] field and/or a rwp_guard_band_reserved_zero_3bits[i][j] field. The meanings of fields of the multiview region-wise packing information is identical to meanings described above.

Specifically, the multiview region-wise packing information may include information about each of the views.

For example, the multiview region-wise packing information may include information about a target view. Here, the target view may be derived based on the viewer's eye-view, viewing position or viewpoint. The 360 video reception apparatus may select the target view by comparing location and/or viewing orientation of views with a viewer's eye-view, viewing position or viewpoint using the metadata.

According to an embodiment, the information about the target view may include a view index of the target view indicating an identifying number of the target view. The view index of the target view may represent the mrwp_view_id[i] field.

Also, the information about the target view may include information indicating a number of components for the target view. The information about the target view may include information about each component of a projected picture for the target view. The information indicating the number of components for the target view may represent the num_component_minus1[i] field.

For example, information about the component of the projected picture may include a component index of the target view indicating an identifying number of the component, and information indicating a type of the component. Also, the information about the component of the projected picture may include information indicating a projection type of the projected picture. The component index of the target view may represent the mrwp_component_id[i][j] field, and the information indicating the type of the component may represent the mrwp_component_type[i][j] field. The information indicating a projection type of the projected picture may represent the mrwp_projection_type[i][j] field. The projection type is one of the equirectangular projection and the cube map projection.

Also, the information about the component of the projected picture may include information indicating width and height of the projected picture, and information indicating horizontal coverage and vertical coverage of the component. The information indicating the width and the height of the projected picture may represent the mrwp_proj_picture_width[i][j] field and the mrwp_proj_picture_height[i][j] field, respectively.

Also, the information about the target view may include an anchor view flag indicating whether the target view is an anchor view. When the anchor view flag indicates the target view is the anchor view, the information about the target view may include information indicating an x component, a y component and a z component of a location of the anchor view. The anchor view flag may represent the mrwp_anchor_view_flag[i] field. The information indicating the x component, the y component and the z component of the location of the anchor view may represent the mrwp_location_anchor_view_x[i] field, the mrwp_location_anchor_view_y[i] field, the mrwp_location_anchor_view_z[i] field, respectively.

Also, when the anchor view flag indicates the target view is the anchor view, the information about the target view may include information indicating a yaw angle, a pitch angle and a roll angle of a rotation of the anchor view. The information indicating the yaw angle, the pitch angle and the roll angle of the rotation of the anchor view may represent the mrwp_rotation_anchor_view_yaw[i] field, the mrwp_rotation_anchor_view_pitch[i] field, the mrwp_rotation_anchor_view_roll[i] field, respectively.

Also, when the anchor view flag indicates the target view is not the anchor view, the information about the target view may include information indicating an x component, a y component and a z component of a location of the target view, and information indicating a yaw angle, a pitch angle and a roll angle of a rotation of the target view. The information indicating the x component, the y component and the z component of the location of the target view may represent the mrwp_location_diff_x[i] field, the mrwp_location_diff_y[i] field, the mrwp_location_diff_z[i] field, respectively. The information indicating the yaw angle, the pitch angle and the roll angle of the rotation of the target view may represent the mrwp_rotation_diff_yaw[i] field, the mrwp_rotation_diff_pitch[i] field, the mrwp_rotation_diff_roll[i] field, respectively.

Also, the information about the target view may include a flag indicating whether one packed region consist all component of the projected picture of the target view. When a value of the flag is 1, the information about the target view may include information indicating a top-left sample position of the packed region in the packed picture, and information indicating width and height of the packed region in the packed picture. The information indicating the top-left sample position of the packed region in the packed picture may represent the mrwp_packed_region_top[i][j] field and the mrwp_packed_region_left[i][j] field, respectively. The information indicating the width and the height of the packed region in the packed picture may represent the mrwp_packed_region_width[i][j] field and the mrwp_packed_region_height[i][j] field, respectively.

Also, for example, the multiview region-wise packing information may include information about a packed region in the packed picture. The packed picture may include a plurality of packed regions, the multiview region-wise packing information may include information about each of the packed regions in the packed picture. The multiview region-wise packing information may include information indicating a number of packed regions in the packed picture. The information indicating the number of the packed regions in the packed picture may represent the num_packed_regions field.

Specifically, the information about the packed region may include a view index for the packed region indicating an identifying number of a view for the packed region and component index indicating an identifying number of a component of the view for the packed region. The view index for the packed region may represent the view_idx[i][j] field, and the component index indicating an identifying number of a component of the view for the packed region may represent the component_idx[i][j][k] field. The multiview region-wise packing information may include information about plurality of components of the view for the packed region. The information about the packed region may include information indicating a number of components of the view for the packed region. The information indicating a number of components of the view for the packed region may represent the num_component_id_minus1[i][j][k] field.

Also, the information about the packed region may include information indicating a top-left sample position of a projected region in the projected picture of the view, and information indicating width and height of the projected region in the projected picture of the view. In deriving process of the projected picture of the view, the packed region may be mapped onto the projected region in the projected picture. The information indicating the top-left sample position of the projected region in the projected picture of the view may represent the proj_region_top[i][j][k] field and the proj_region_left[i][j][k] field, respectively. The information indicating the width and the height of the projected region in the projected picture of the view may represent the proj_region_width[i][j][k] field and the proj_region_height[i][j][k] field, respectively.

Also, the information about the packed region may include information indicating a top-left sample position of the packed region in the packed picture, and information indicating width and height of the packed region in the packed picture. The information indicating the top-left sample position of the packed region in the packed picture may represent the packed_region_top[i] field and the packed_region_left[i] field, respectively. The information indicating the width and the height of the packed region in the packed picture may represent the packed_region_width[i] field and the packed_region_height[i] field, respectively.

Meanwhile, when a value of the view index for the packed region is match with a value of the view index of the target view and a value of the component index for the packed region is match with a value of the component index of the target view, the packed region may be derived as the specific packed region for the projected picture of the target view.

Also, for example, the information about the packed region may include a guard band flag indicating whether a guard band of the packed region is present. The guard band flag may represent the rwp_guard_band_flag[i] field.

Also, when the guard band flag indicates the guard band of the packed region is present, the information about the packed region may include information indicating width of a left guard band of the packed region, information indicating width of a right guard band of the packed region, information indicating height of an upper guard band of the packed region, and information indicating height of a lower guard band of the packed region. The information indicating the width of the left guard band of the packed region, the information indicating the width of the right guard band of the packed region, the information indicating the height of the upper guard band of the packed region, and the information indicating the height of the lower guard band of the packed region may represent the rwp_left_guard_band_width[i] field, the rwp_right_guard_band_width[i] field, the rwp_top_guard_band_width[i] field, the rwp_bottom_guard_band_width[i] field, respectively.

The 360 video reception apparatus decodes the packed picture based on the information on the packed picture (S1720). The 360 video reception apparatus can decode the packed picture based on the information on the packed picture.

The 360 video reception apparatus derives a specific packed region for a target view from the packed picture based on the metadata (S1730). The 360 video reception apparatus may select a packed region based on the view index for the packed region and the component index for the packed region. For example, when a value of the view index for the packed region is match with a value of the view index of the target view and a value of the component index for the packed region is match with a value of the component index of the target view, the packed region is derived as the specific packed region.

The 360 video reception apparatus derives a projected picture of the target view based on the specific packed region and the metadata (S1740). The specific packed region is mapped onto the projected region in the projected picture. The projected region for the specific packed region is derived based on the information about the specific packed region.

The 360 video reception apparatus renders the projected picture based on the metadata (S1750). For example, the 360 video reception apparatus may perform re-projection on the decoded picture. The 360 video reception apparatus may re-project the decoded picture on a 3D space based on the metadata. The 3D space may have different forms depending on 3D models of the projection type for the component of the target view. For example, the metadata may include information about a projection type of a 3D model and detailed information of the 3D model (e.g., the mrwp_projection_type[i][j] field). According to an embodiment, the 360 video reception apparatus may re-project a region of the projected picture corresponding to a specific area of the 3D space on the 3D space using the metadata. The 360 video reception apparatus may render the re-projected picture. According to an embodiment, the renderer may render only a part viewed by a user according to viewport information of the viewer.

FIG. 18 schematically illustrates a 360 video reception apparatus for performing a 360 video data processing method according to the present invention. The method illustrated in FIG. 17 may be performed by the 360 video reception apparatus illustrated in FIG. 18. Specifically, the data input unit of the 360 video reception apparatus in FIG. 18 can perform S1700 in FIG. 17, the reception processor/ file extraction unit of the 360 video reception apparatus in FIG. 18 can perform S1710 in FIG. 17, the data decoder of the 360 video reception apparatus in FIG. 18 can perform S1720 in FIG. 17, and the renderer of the 360 video reception apparatus in FIG. 18 can perform S1750 in FIG. 17.

According to the present invention, it is possible to propose a method for providing interactive experience in 3DoF+ content consumption of users by supporting head motion parallax.

Also, according to the present invention, a packed picture containing components for a plurality of views may be generated by the multiview region-wise packing. Accordingly, bit efficiency of the 3DoF+ content may be increased by eliminating redundant information between views.

The above-described steps may be omitted according to an embodiment or replaced by other steps of performing similar/identical operations.

The 360 video transmission apparatus according to an embodiment of the present invention may include the above-described data input unit, stitcher, signaling processor, projection processor, data encoder, transmission processor and/or transmitter. The internal components have been described above. The 360 video transmission apparatus and internal components thereof according to an embodiment of the present invention may perform the above-described embodiments with respect to the method of transmitting a 360 video of the present invention.

The 360 video reception apparatus according to an embodiment of the present invention may include the above-described receiver, reception processor, data decoder, signaling parser, reprojection processor and/or renderer. The internal components have been described above. The 360 video reception apparatus and internal components thereof according to an embodiment of the present invention may perform the above-described embodiments with respect to the method of receiving a 360 video of the present invention.

The internal components of the above-described apparatuses may be processors which execute consecutive processes stored in a memory or hardware components. These components may be located inside/outside the apparatuses.

The above-described modules may be omitted or replaced by other modules which perform similar/identical operations according to embodiments.

The above-described parts, modules or units may be processors or hardware parts executing consecutive processes stored in a memory (or a storage unit). The steps described in the aforementioned embodiments can be performed by processors or hardware parts. Modules/blocks/units described in the above embodiments can operate as hardware/processors. The methods proposed by the present invention can be executed as code. Such code can be written on a processor-readable storage medium and thus can be read by a processor provided by an apparatus.

In the above exemplary systems, although the methods have been described based on the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means. The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices.

The invention claimed is:

1. A video data processing method performed by a video reception apparatus, the method comprising:
receiving video data including a picture in which regions for multiple views are packed and metadata;
decoding the picture; and
rendering pictures for the multiple views,
wherein the regions are mapped to the multiple views for view representation based on information for the regions in the metadata,
wherein the information for the regions includes position information for the regions in the picture, view identifier information representing multiple views for the regions, position information in which the regions are represented in the multiple views for the view identifier information, information for a transformation type applied for the regions, and depth information for the regions.

2. The method of claim 1,
wherein the information for the regions includes information for width size of a region, information for height size of a region,
wherein the position information for the regions in the picture includes information for a vertical position of the region and information for a horizontal position of the region.

3. The method of claim 1,
wherein the metadata further includes information for transformation for a region including at least one of
a first value for mirroring the region,
a second value for rotating the region by 180 degrees,
a third value for mirroring the region and rotating the region by 180 degrees,
a fourth value for rotating the region by 90 degrees and mirroring the region,
a fifth value for rotating the region by 90 degrees,
a sixth value for rotating the region by 270 degrees, or
a seventh value for rotating the region by 270 degrees and mirroring the region.

4. The method of claim 1,
wherein the metadata further includes information for a number of regions for the multiple views.

5. The method of claim 1,
wherein the metadata further includes a guard band flag indicating whether a guard band of a region of the regions is present,
wherein when the guard band flag indicates the guard band of the region is present, the information for the regions further includes information indicating width of a left guard band of the region, information indicating width of a right guard band of the region, information indicating height of an upper guard band of the region, and information indicating height of a lower guard band of the region.

6. The method of claim 1,
wherein the metadata further includes information related to the pictures including information about a component of the pictures,
wherein the information about the component of the pictures includes a component index of a specific view indicating an identifying number of the component,
the information about the component of the pictures includes an anchor view flag indicating whether the specific view is an anchor view,
wherein when the anchor view flag indicates the specific view is the anchor view, the information about the component of the pictures further includes information indicating an x component, a y component and a z component of a location of the anchor view and information indicating a yaw angle, a pitch angle and a roll angle of a rotation of the anchor view,
wherein when the anchor view flag indicates the specific view is not the anchor view, the information about the component of the pictures further includes information indicating an x component, a y component and a z component of a location of the specific view,
wherein the information about the component of the pictures includes component index indicating an identifying number of a component of the view for the regions.

7. A video data processing apparatus, the apparatus comprising:
a receiver configured to receive video data including a picture in which regions for multiple views are packed and metadata;
a decoder configured to decode the picture; and
a renderer configured to render pictures for the multiple views;
wherein the regions are mapped to the multiple views for view representation based on information for the regions in the metadata,
wherein the information for the regions includes position information for the regions in the picture, view identifier information representing multiple views for the regions, position information in which the regions are represented in the multiple views for the view identifier information, information for a transformation type applied for the regions, and depth information for the regions.

8. The apparatus of claim 7,
wherein the information for the regions includes information for width size of a region, information for height size of a region,
wherein the position information for the regions in the picture includes information for a vertical position of the region and information for a horizontal position of the region.

9. The apparatus of claim 7,
wherein the metadata further includes information for transformation for a region including at least one of
a first value for mirroring the region,
a second value for rotating the region by 180 degrees,
a third value for mirroring the region and rotating the region by 180 degrees,
a fourth value for rotating the region by 90 degrees and mirroring the region,
a fifth value for rotating the region by 90 degrees,
a sixth value for rotating the region by 270 degrees, or
a seventh value for rotating the region by 270 degrees and mirroring the region.

10. The apparatus of claim 7,
wherein the metadata further includes information for a number of regions for the multiple views.

11. The apparatus of claim 7,
wherein the metadata further includes a guard band flag indicating whether a guard band of a region of the regions is present,
wherein when the guard band flag indicates the guard band of the region is present, the information for the regions further includes information indicating width of a left guard band of the region, information indicating width of a right guard band of the region, information indicating height of an upper guard band of the region, and information indicating height of a lower guard band of the region.

12. A video data processing apparatus, the apparatus comprising:
an acquirer configured to acquire a picture for multiple views,
wherein regions for the multiple views are packed onto the picture;
an encoder configured to encode the picture;
a transmitter configured to transmit the picture and metadata,
wherein the metadata includes information for the regions,
wherein the information for the regions includes position information for the regions in the picture, view identifier information representing multiple views for the regions, position information in which the regions are represented in the multiple views for the view identifier information, information for a transformation type applied for the regions, and depth information for the regions,
wherein the regions are mapped to the multiple views for view representation based on information for the regions in the metadata.

13. A video data processing method performed by a video transmission apparatus, the method comprising:
acquiring a picture for multiple views,
wherein regions for the multiple views are packed onto the picture;
encoding the picture;
transmitting the picture and metadata,
wherein the metadata includes information for the regions,
wherein the information for the regions includes position information for the regions in the picture, view identifier information representing multiple views for the regions, position information in which the regions are represented in the multiple views for the view identifier information, and information for a transformation type applied for the regions, and depth information for the regions,
wherein the regions are mapped to the multiple views for view representation based on information for the regions in the metadata.

* * * * *